United States Patent
Tso et al.

(10) Patent No.: US 8,161,865 B2
(45) Date of Patent: Apr. 24, 2012

(54) MODULAR FLAVOR DISPENSER FOR USE WITH FOOD OR BEVERAGE MACHINES

(75) Inventors: Gilbert T. Tso, Chicago, IL (US); James Martin, Arlington Heights, IL (US); John Hsing, Chicago, IL (US); Ryan Hanawalt, Cary, IL (US); Anton Obrecht, Arlington Heights, IL (US)

(73) Assignee: Fluid Management Operations, LLC, Wheeling, IL (US)

( * ) Notice: Subject to any disclaimer, the term of this patent is extended or adjusted under 35 U.S.C. 154(b) by 638 days.

(21) Appl. No.: 12/355,968

(22) Filed: Jan. 19, 2009

(65) Prior Publication Data

US 2009/0285966 A1 Nov. 19, 2009

Related U.S. Application Data

(60) Provisional application No. 61/052,840, filed on May 13, 2008.

(51) Int. Cl.
*A23F 5/46* (2006.01)

(52) U.S. Cl. ....... 99/275; 222/129.3; 222/132; 222/135; 222/144.5; 222/1

(58) Field of Classification Search .................. 426/593; 222/129.3, 132, 135, 144.5, 1; 99/275
See application file for complete search history.

(56) References Cited

U.S. PATENT DOCUMENTS

| | | | |
|---|---|---|---|
| 7,798,367 B2 * | 9/2010 | Minard et al. | 222/145.6 |
| 2003/0200871 A1 | 10/2003 | Mangiapane | |
| 2008/0034977 A1 | 2/2008 | Halle et al. | |
| 2008/0038441 A1 | 2/2008 | Kirschner | |

* cited by examiner

*Primary Examiner* — Anthony Weier
(74) *Attorney, Agent, or Firm* — Miller, Matthias & Hull LLP

(57) ABSTRACT

An improved modular flavor dispenser for dispensing a plurality of different flavors is shown and described. One disclosed modular flavor dispenser includes a controller that is linked to a coordinator or interface with a controller associated with the food or beverage dispenser. For example, an automated coffee machine may include its own controller. The controller of the coffee machine communicates with the coordinator or interface of the modular flavor dispenser which, in turn, communicates with the motor control board or controller of the flavor dispenser. The flavor coordinator board may have a memory with a plurality of recipes stored therein or that information may be communicated from the controller of the coffee machine. The flavor coordinator board is linked to the motor control board which, in turn, is linked in parallel with the plurality of pumps used to dispense the variety of flavors. In the example of gourmet coffee, four or more pumps may be used: vanilla, hazelnut, cinnamon, caramel, chocolate as well as other flavors. Improved techniques for pumping chocolate syrup are also disclosed that involve the use of nutating piston-type pumps.

12 Claims, 20 Drawing Sheets

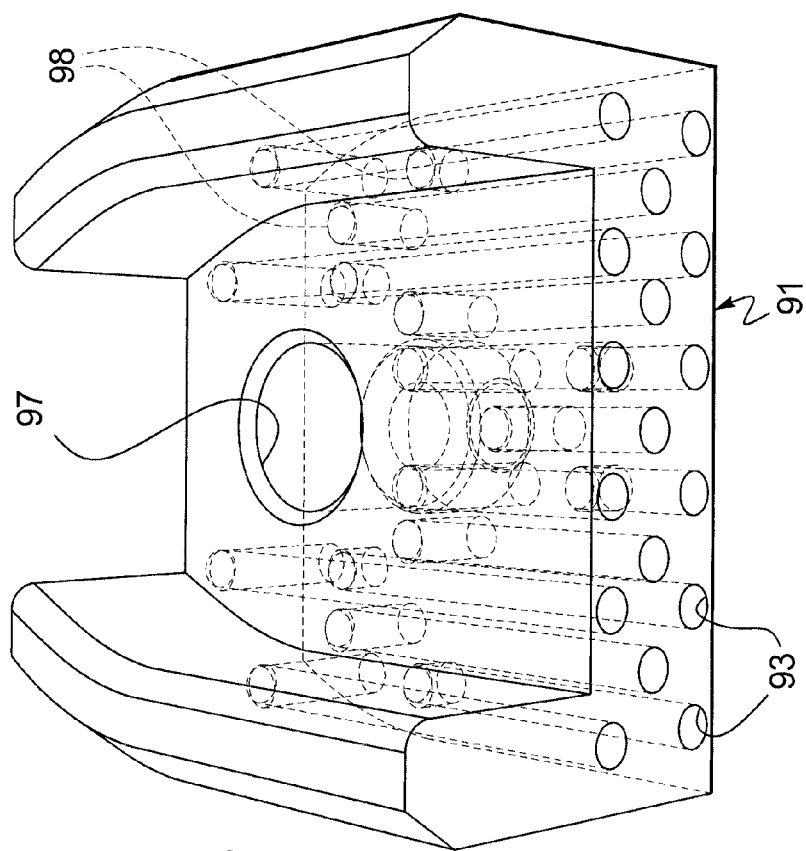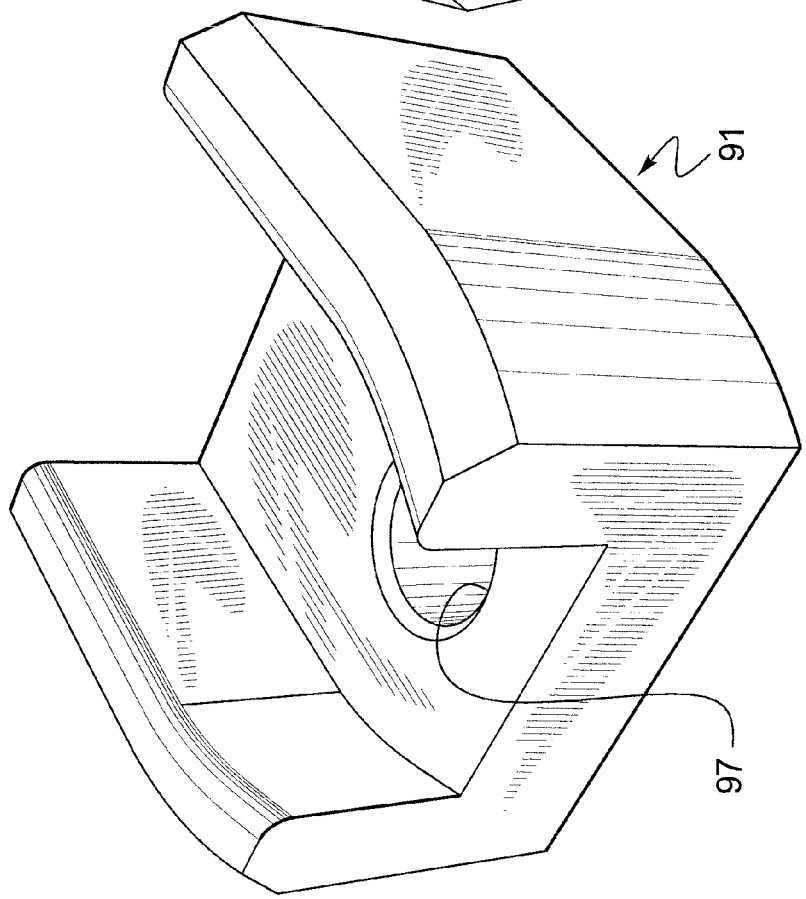

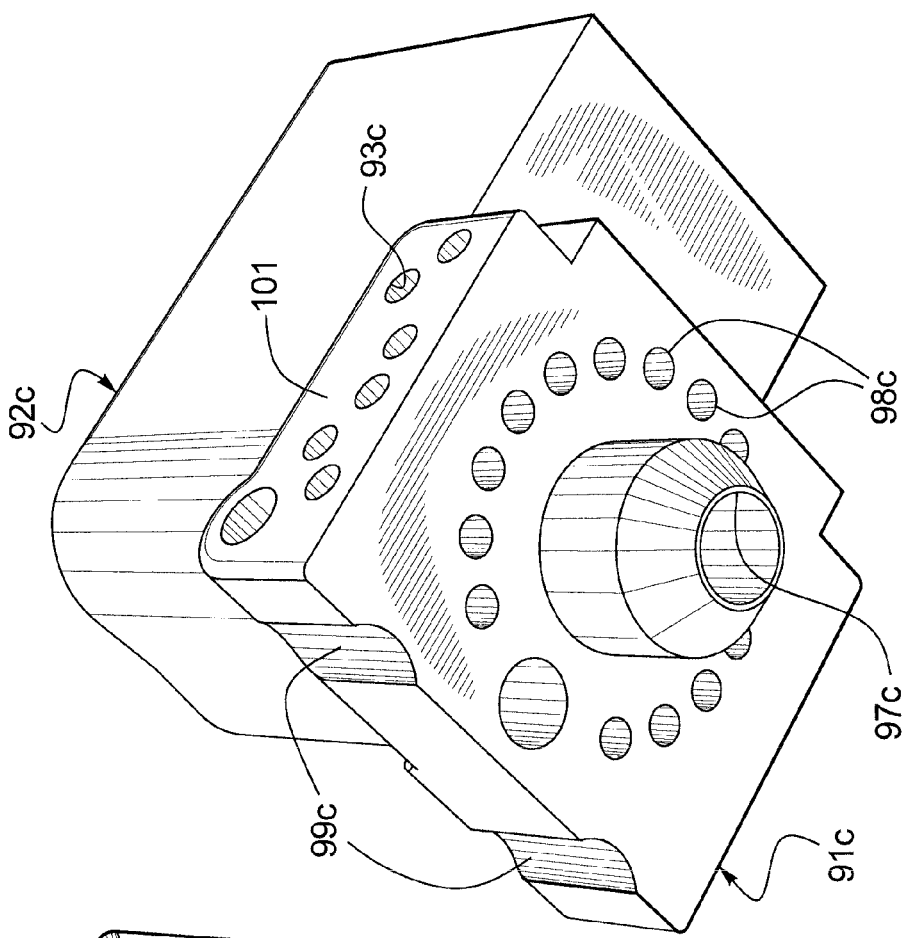
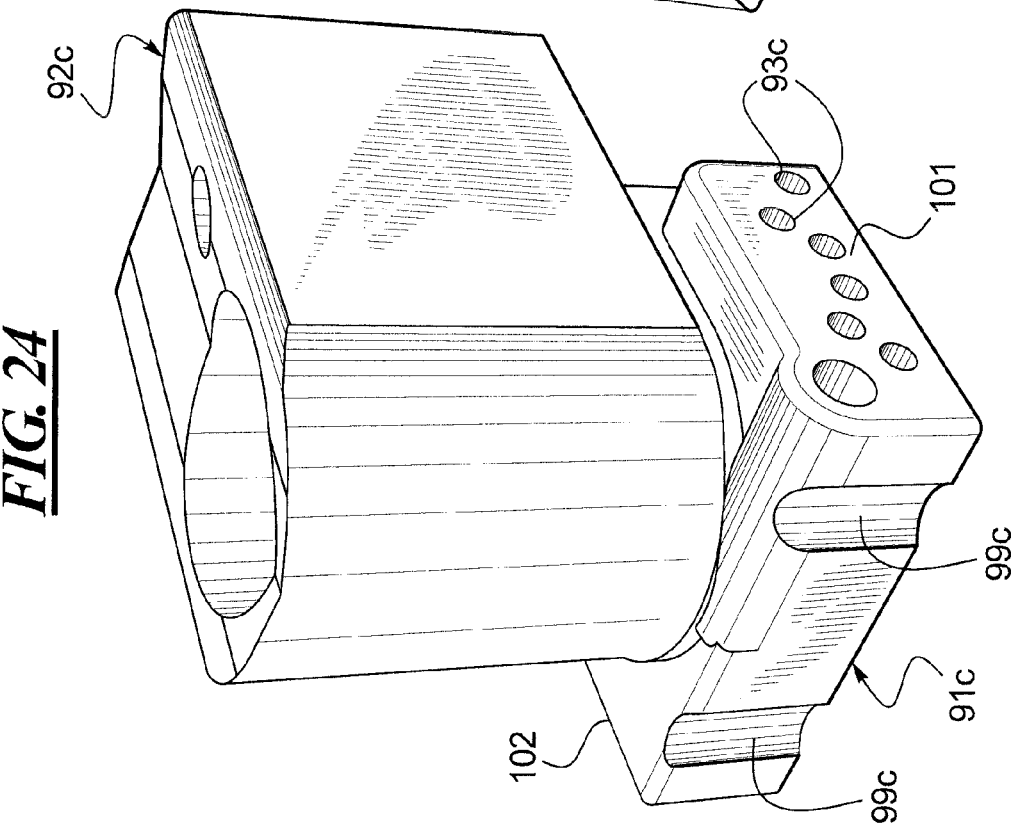

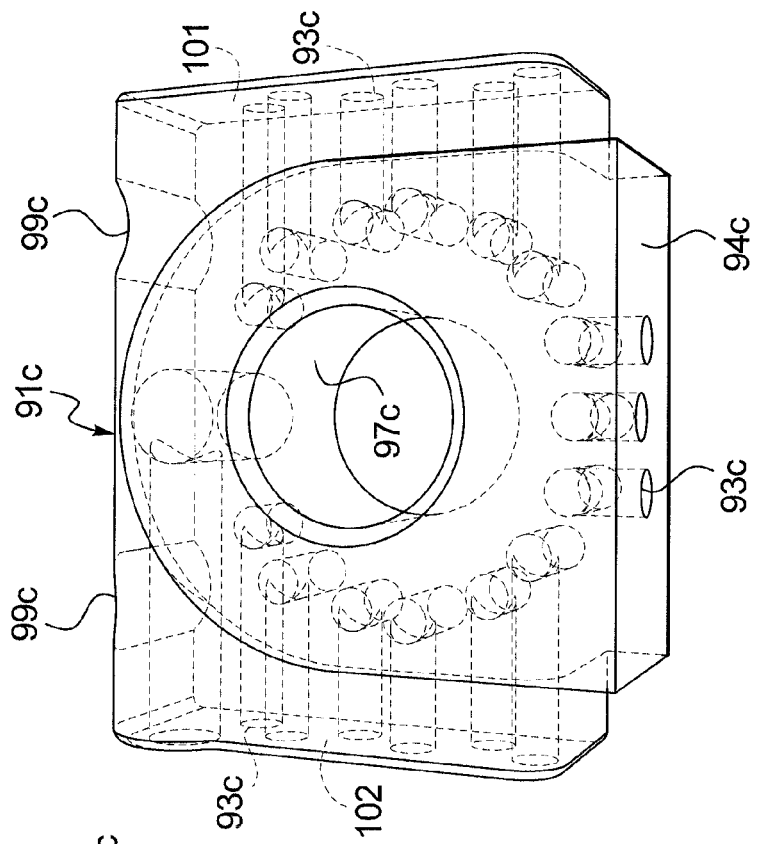
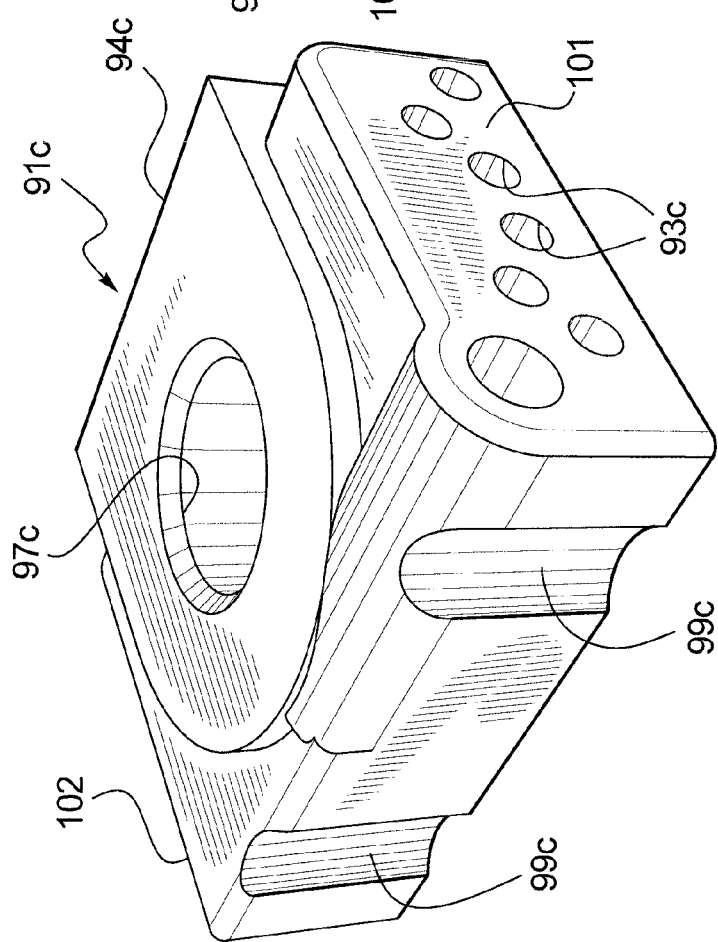

MODULAR FLAVOR DISPENSER FOR USE WITH FOOD OR BEVERAGE MACHINES

BACKGROUND

1. Technical Field

A modular flavor dispenser is disclosed for dispensing one or more flavors according to a formula request stored in a controller, either located at the flavor dispenser, at the food or beverage machine, in a remote location or the request may be the result of the cooperation of two controllers. Separate controllers can be provided at both the modular flavor dispenser and the food or beverage machine with an interface or coordinator disposed therebetween. The controller(s) is linked to one or more motor control boards which, in turn, are linked to one or more pump modules for delivering the flavors. The pumps can share control boards. That is, two pumps can be assigned to a single control board. The pump modules, which include the circuitry or motor control board, pump and flavor reservoirs as well as motors for driving the pump, are all mounted in a modular frame which may be detachably connected to the food or beverage machine, or disposed remotely from the food preparation area. For modular flavor dispensers disposed in remote locations, an intermediate pumping station may be provided for delivering the flavors to the food or beverage machine at the correct pressure or flow rate. The disclosed dispenser is particularly useful for the accurate pumping and dispensing of chocolate syrup.

2. Description of the Related Art

Systems for dispensing a plurality of different fluids into a container have been known and used for many years. For example, systems for dispensing paint based materials and colorants into a paint container are known. These paint systems may use twenty or more different colorants to formulate a paint mixture. Each colorant is contained in a separate canister or package and may include its own dispensing pump, e.g., see U.S. Pat. No. 6,273,298, which is commonly assigned with the present application. The colorants and the respective pumps may be disposed on a turntable or along one or more horizontal rows. In a turntable system, the turntable is rotated so that the colorant to be dispensed is moved to a position above the container being filled. In designs using one or more horizontal rows, the container may be moved laterally to the appropriate colorant/pump.

Some currently available paint colorant dispensers utilize nutating pumps and a computer control system to control the nutating pumps. Nutating pumps have a piston which is positioned inside of a housing having a fluid inlet and a fluid outlet. The piston simultaneously slides axially and rotates inside the housing. The dispense stroke or cycle can be broken down into a number of discreet steps or segments for extremely accurate volumetric dispenses. For example, a minimum dispense can be as little as $\frac{1}{256}$ of a fluid ounce as illustrated in U.S. Pat. Nos. 6,749,402, 6,540,486 and 6,398,515, all commonly assigned with the present application. These patents all disclose improved nutating pump technologies that are applicable to paint colorant dispensing as well as the dispensing of hair dyes, other cosmetics applications and other fluids.

Systems for dispensing large varieties of different fluids are not limited to paints, but also include systems for dispensing pharmaceutical products, hair dye formulas, cosmetics of all kinds, nail polish, food recipes, etc. Smaller systems for use in preparing products at a point of sale may use a stationary manifold through which pluralities of nozzles extend. Each fluid to be dispensed is then pumped through its individual nozzle. Depending upon the size of the container and the quantity of the fluids to be dispensed, manifolds must be designed in a space efficient manner so that a single manifold can accommodate twenty or more different nozzles. The nozzles are connected to the various ingredients by flexible hoses and the ingredients are contained in stationary canisters or containers.

In multiple fluid dispensing applications for the food and beverage industries, both precision and speed are essential. Precision is essential as many recipes require the addition of precise amounts of ingredients. Speed is of paramount importance, especially in fast food and coffee retail establishments.

In a typical coffee shop, automated dispensers for coffee flavors are generally not available. Instead, only steam, steamed milk, milk or cream are available and the "barista" must add flavors by hand pouring or use of hand pumps. This practice leads to inconsistencies with different operators. Hand pumping or pouring can also lead to spills which are difficult and/or time consuming to clean. Furthermore, the addition of the flavors is in a secondary step, which increases the process time to make a cup of flavored/gourmet coffee, much to the chagrin the ever increasingly impatient consumer. Thus, currently available gourmet coffee machines cannot control pumping of a variety of flavor solutions. This creates difficulties when different fluids are required from different pumping stations or containers.

The accurate automatic dispensing of chocolate materials is particularly problematic because of its viscosity and peculiar fluid properties of chocolate syrup. Chocolate syrup typically includes unsweetened cocoa powder, corn syrup, sugar, flavors such as vanilla extract and water, each of which have very different physical properties. As a result, chocolate syrup is an emulsion with a relatively high viscosity (depending upon the particular product) but is relatively incompressible. Therefore, dispensing chocolate syrup accurately is extremely difficult and if dispensed inaccurately, the beverage may be rejected by the consumer and/or chocolate may be wasted. Chocolate is an expensive ingredient and wasted chocolate adversely affects profit margins. Accordingly, dispensing chocolate syrup in the gourmet coffee application presents a very different set of problems than dispensing other flavors such as vanilla, hazelnut, caramel or cinnamon flavors.

Further, in some retail environments, floor space or counter space is at a premium. Therefore, there is a need for a flavor module that can be disposed remotely, such as in a different room or in a basement of a coffee shop or restaurant without compromising the accuracy of the flavoring dispensing.

In short, currently available fluid dispensing systems are not easy to modify or adapt to different uses or for dispensing different materials used in food and beverage applications. What is needed is an improved multiple fluid dispensing whereby the pumps, reservoirs containing the fluids to be dispensed, motors and manifolds may be easily changed or replaced so that flavor modules may be adapted for changing consumer demands or adapted for different food/beverage applications.

There is also a need for an improved multiple flavoring dispensing system or flavoring module that is fast, efficient, and that may be easily adapted or modified for different food and beverage applications. An improved means for accurately dispensing chocolate syrup is also needed that addresses the complexities of pumping this particular fluid, but which also accurately pumps conventional water based syrups. Further, there is also a need for an improved flavoring dispensing system that may be disposed remotely from the food or beverage machine.

SUMMARY OF THE DISCLOSURE

In satisfaction of the aforenoted needs, an improved modular flavor dispenser for dispensing a plurality of different flavors is shown and described. One disclosed modular flavor dispenser comprises a controller that is linked to a coordinator or interface with a controller associated with a food or beverage dispenser. For example, an automated coffee machine may include its own controller. The controller of the coffee machine communicates with the coordinator or interface of the modular flavor dispenser which, in turn, communicates with the motor control board or controller of the flavor dispenser. The flavor coordinator board has a memory with a plurality of recipes stored therein. The flavor coordinator board is linked to the motor control board which, in turn, is linked in series with the plurality of pumps used to dispense the variety of flavors. In the example of gourmet coffee, four or more pumps may be used: vanilla, hazelnut, caramel, cinnamon, chocolate as well as other flavors.

In a refinement, the pumps for vanilla, hazelnut, caramel and cinnamon may be selected from the group consisting of nutating, piston, gear, peristaltic and diaphragm pumps. Preferably, chocolate is dispensed using a nutating piston-type pump such as those disclosed in U.S. Pat. Nos. 6,749,402, 6,540,486 and 6,398,515, all commonly assigned with the present application, and all are incorporated herein by reference. For lighter syrups, conventional peristaltic pumps are preferred over piston, gear and diaphragm pumps, although these types of pumps can be designed for types of applications discussed herein.

All of the pumps used by the modular flavor dispenser may be nutating piston pumps although a combination of nutating piston pumps and peristaltic pumps may be more cost-effective.

In another refinement, one or more of the motors that controls the pumps of the modular fluid dispenser, at the end of the dispensed execution, executes at least a partial reverse rotation to draw fluid back into the nozzle tip (or "suck back") to avoid dripping, minimize nozzle drying, and to improve dispense repeatability and accuracy. The suck back operation is preferably controlled through the motor control board but can be controlled by circuitry of each pump module.

In a further refinement of this concept, the disclosed flavor dispenser comprises from four (4) to seventeen (17) modules for simultaneous dispensing of from four (4) to seventeen (17) different flavors, in addition to coffee, hot water or steam and milk/cream or steamed milk/cream.

In a refinement, a CAN or CAN Bus computer network protocol and bus standard is employed to allow the coffee machine controller to communicate with the flavor module dispense coordinator and the flavor module motor control board.

In another refinement, each pump, with the possible exception of the chocolate pump, is connected to its respective outlet nozzle by a flexible hose and each outlet nozzle is mounted within a manifold or a manifold block, located in the manifold module at the coffee machine. Various modifications to the coffee machine manifold are disclosed herein, and other variations will be apparent to those skilled in the art. In short, the modular flavor dispenser disclosed herein can be conveniently connected by conduits or hoses to the manifold of an existing coffee machine with only a simple modification to the coffee machine manifold.

In a further refinement, the flavors are directed at an angle towards a center of a coffee cup disposed below the coffee machine manifold to thereby encourage mixing and eliminate the need for additional stirring by the operator. The self-stirring addition of flavors to the coffee also speeds up the coffee preparation process.

In another refinement, when the flavoring module is disposed remotely from the coffee, food or beverage machine, i.e., by 20 feet or more, an intermediate pumping station may be provided to ensure that the flavors are delivered to the coffee or food machine at the appropriate pressure and flow rate. In a further refinement of this concept, use of an intermediate pumping station may permit the modular flavor station to be disposed at 100 or more lateral feet and 20 or more vertical feet from the coffee, food or beverage machine.

While this disclosure is directed primarily at flavors for gourmet coffee machines, it will be noted that the modular flavor dispenser disclosed herein is applicable to foods and beverages of all kinds, and this disclosure is not limited to the flavoring of coffee or tea.

In another refinement, because of the special problems associated with pumping chocolate syrup, with a viscosity of 2500 centipoise and relative incompressibility, more rigid tubing may be used for chocolate, such as steel (stainless) tubing or hard plastic tubing. The non-chocolate flavors, such as vanilla, hazelnut, caramel and cinnamon syrups, with viscosities ranging from 50 centipoise to 200 centipoise, can be transmitted in less rigid or more flexible tubing.

In a refinement, the non-chocolate flavors are dispensed from flexible bags. In a further refinement of this concept, chocolate syrup is dispensed from a bottle. In a further refinement of this concept, the chocolate syrup is dispensed from an inverted bottle, wherein the connection between the chocolate syrup bottle and tubing that communicates the chocolate syrup to the manifold is disposed below the remainder of the bottle to reduce waste. In a related refinement, chocolate syrup is dispensed from a flexible bag, with the bag being inverted and the connection between the bag and the tubing that communicates the chocolate syrup to the manifold is disposed below the remainder of the bag to reduce waste.

In a refinement, a plurality of manifold adapters intended to be used with a manifold of an existing coffee dispenser are disclosed. In another refinement, a plurality of manifolds are disclosed which are intended to replace existing manifolds of coffee machines so that the replacement manifolds are able to handle the dispensing of coffee, steam, milk and a plurality of flavors. Various manifold designs are anticipated, with and without "suck-back" capability to limit or eliminate dripping which leads to an accurate dispensing.

In a different refinement, the reservoir of at least one flavor is provided in a flexible bag. Flavors may be provided in flexible bags or more rigid canisters.

The disclosed dispenser can be designed for simultaneously dispensing a plurality of flavors for a faster dispense. Simultaneous dispensing encourages mixing thereby limiting the amount of stirring required by the barista or food server. For example, multiple flavors can be added and a customized 12 ounce cup of coffee can be dispensed in about 20 seconds. Similarly, multiple flavors can be added and a 20 ounce cup of coffee can be dispensed in about 30 seconds.

In a refinement, sequential dispensing can be employed for a layered beverage or food product wherein different layers of the product have distinctly different flavors or textures.

In a refinement, the nozzle heads can be modified, but do not require regular cleaning. Further, the flavor dispense system does not need regular cleaning. Still further, cross-contamination of the flavors is avoided as each flavor includes its own pump, conduit and nozzle.

Accordingly, an improved modular flavor dispenser is disclosed for dispensing a plurality of flavors to a separate food or beverage machine. The modular flavor dispenser comprises a dispense coordinator board linked to a motor control board. The dispense coordinator board executes a selected recipe by sending a series of signals to the motor control board. The motor board is linked in series to a plurality of pump modules. Each pump module includes a pump module board, at least one pump and at least one flavor reservoir. Each pump is linked between its own flavor reservoir and its own outlet conduit, and includes its own motor. The coordinator board, motor control board and pump module boards are programmed for the pumping of multiple flavors from the reservoirs to the separate machine in accordance with a selected recipe.

The selected recipe is transmitted to the coordinator board by a board disposed in the separate food or beverage machine, or the recipes can be stored on the modular flavor dispenser coordinator board. Hence, primary control can take place at the food or beverage machine or at the modular flavor dispensing machine. The disclosed modular flavor dispenser can be designed to work with machines having little or no automated controls.

In a refinement, algorithms executed by the motor control board are dependent upon temperatures of the flavors being pumped.

In another refinement, algorithms executed by the dispense coordinator board are dependent upon temperatures of the flavors being pumped.

In still another refinement, algorithms executed by the motor control board are dependent upon a temperature of at least one circuit disposed on the motor control board.

And, in another refinement, algorithms executed by the dispense coordinator board are dependent upon a temperature of at least one circuit disposed on the motor control board.

A method for dispensing multiple flavors of a recipe is disclosed which comprises: a) placing a container below a manifold of a separate food or beverage machine; b) selecting a recipe from a selection interface disposed on the separate food or beverage machine; c) communicating the recipe from a controller located on the separate food or beverage machine to coordinator board disposed on a modular flavor dispenser; d) communicating an amount of at least one flavor from the coordinator board to a motor control board of the modular flavor dispenser; and e) pumping a desired amount of the flavor into the container in accordance with the recipe from a flavor reservoir by a pump under the control of the motor control board.

In a refinement, at least one of the flavors selected is chocolate syrup which is pumped from an inverted bottle or an inverted bag. In a further refinement, at least one flavor other than chocolate is selected and is pumped from an upright bottle or a flexible bag.

An improved method for making flavored coffee is also disclosed. This improved method comprises: a) providing a modular flavor dispenser for dispensing a plurality of flavors, the modular flavor dispenser comprising a dispense coordinator board linked to a motor control board, the motor control board linked to a plurality of pump modules, each pump module being linked to a pump motor, each pump motor being connected to a pump, each pump being connected to a flavor reservoir and an outlet conduit; b) providing a separate coffee machine comprising a manifold with a plurality of nozzles, each outlet conduit of the modular flavor dispenser being connected to one of the nozzles of the manifold, the manifold further being connected to a coffee reservoir; c) selecting a desired coffee recipe at an interface disposed on a separate coffee machine; d) communicating the desired coffee recipe to the dispense coordinator board of the modular flavor dispenser; e) communicating at least one flavor dispense instruction from the dispense coordinator board to the motor control board; f) communicating at least one dispense instruction from the motor control board to at least one pump connected to one of the flavor reservoirs; and g) pumping the at least one flavor from its respective pump, through its respective conduit and through its respective manifold to a container disposed below the manifold.

Other advantages and features will be apparent from the following detailed description when read in conjunction with the attached drawings.

BRIEF DESCRIPTION OF THE DRAWINGS

For a more complete understanding of this disclosure, reference should now be made to the embodiments illustrated in greater detail in the accompanying drawings, wherein:

FIGS. 18-29 illustrate various flavor manifolds that can be added to an existing milk steamer/foam manifold that features ports or nozzles for seventeen (17) flavors;

It should be understood that the drawings are not necessarily to scale and that the embodiments are often illustrated by graphic symbols, phantom lines, diagrammatic representations and fragmentary views. In certain instances, details have been omitted which are not necessary for an understanding of the disclosed embodiments or which render other details difficult to perceive. It should be understood, of course, that this disclosure is not limited to the particular embodiments illustrated herein.

DETAILED DESCRIPTION OF THE PRESENTLY PREFERRED EMBODIMENTS

Figure 1:
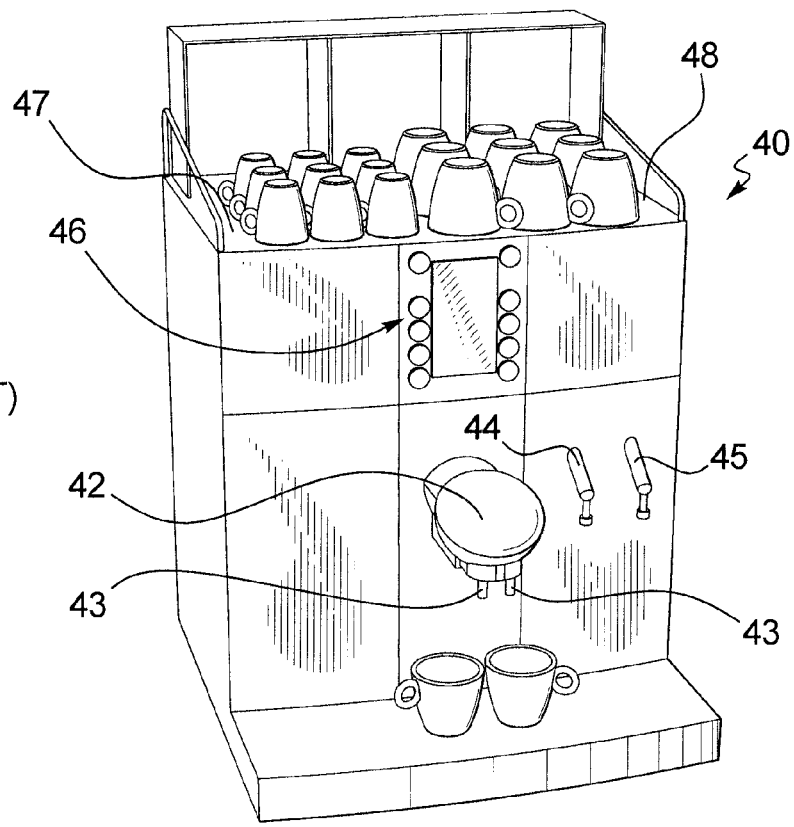
FIG. 1 is a perspective view of an existing automated gourmet coffee machine.

FIG. 1 illustrates a gourmet coffee machine 40 known in the art and available from Franke Coffee Systems North America (http://www.franke.com/). The machine 40 as shown in FIG. 1, while capable of providing a variety of beverages, has little or no flavoring capabilities. Thus, the barista or a restaurant worker must add flavors manually when a customer orders a flavored coffee. To satisfy the problems associated with the manual addition of flavors to coffee, and particularly to high quality gourmet coffee, a modular flavor dispenser 41 is disclosed herein as shown attached to the machine 40 in FIG. 2.

Figure 2:
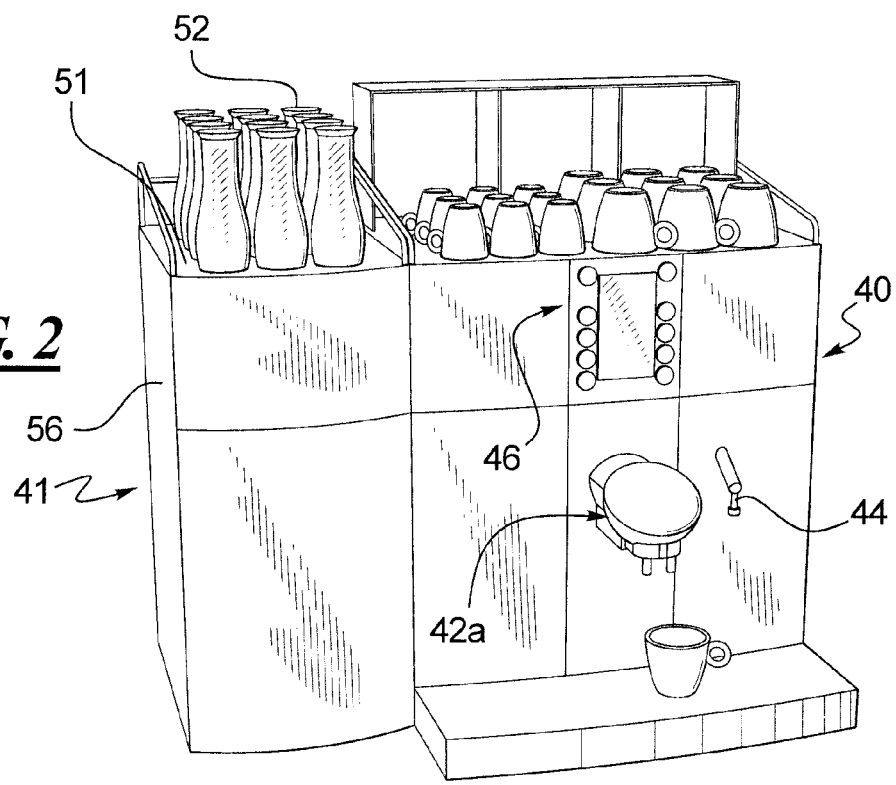
FIG. 2 is a perspective view of the coffee machine shown in FIG. 1 connected to a disclosed modular flavor dispenser.

Referring to FIGS. 1 and 2, the coffee machine 40 includes a manifold 42 with coffee nozzles shown at 43 and separate steam and milk nozzles shown at 44, 45 respectively. The user interface is provided at 46 with a plurality of buttons for selecting the desired beverage. The top 47 of the machine 40 provides a convenient storage space for coffee mugs 48. In FIG. 2, the top 51 of the flavor module 41 also provides a convenient surface for storing mugs or glasses 52. The manifold 42a of the machine 40 requires modification when the modular flavor dispenser 41 is incorporated into the machine 40. For example, the milk nozzle 45 shown in FIG. 1 can be incorporated into the manifold 42a as described below in connection with FIGS. 18-31.

Figure 3:
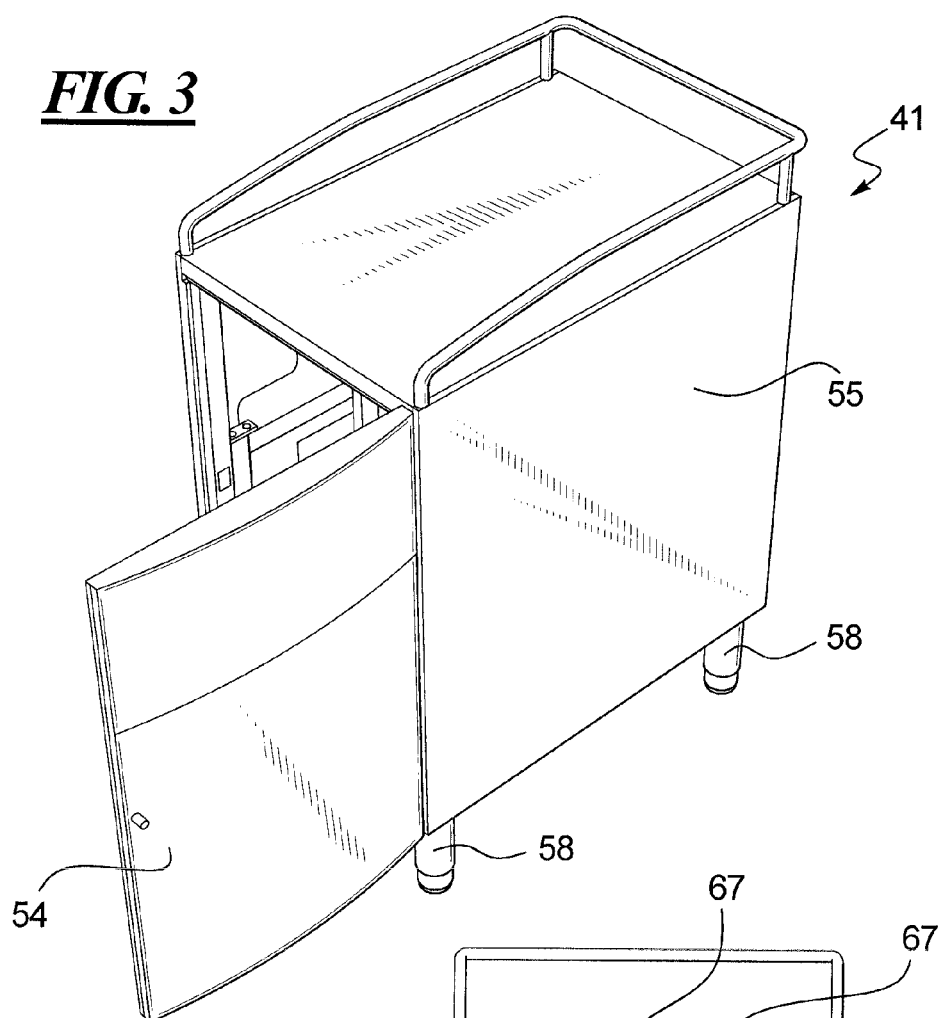
FIG. 3 is a perspective view of the disclosed modular flavor dispenser shown in FIG. 2.
Figure 4:
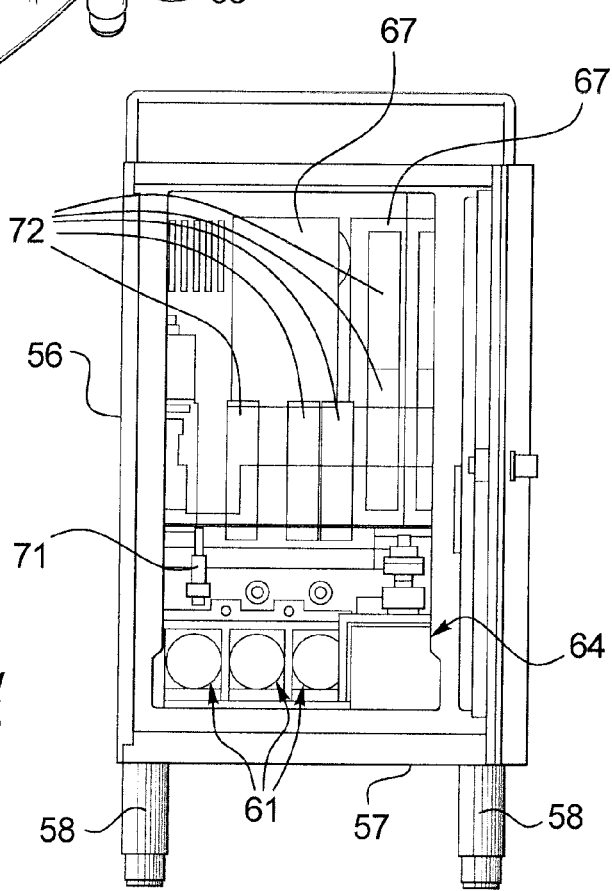
FIG. 4 is a front plan view of the modular flavor dispenser shown in FIGS. 2-3, with the front door open.

Turning to FIGS. 3-4, a disclosed modular flavor dispenser 41 may include an access door 54, side panels 55, 56 and a bottom panel 57 which is supported above a floor (not shown) by a plurality of legs 58 or other suitable supporting structure. Obviously, in a restaurant or food service environment, maintaining cleanliness of the floor or counter is important, thereby requiring appliances such as the dispenser 41 to be elevated by legs or other supporting structures 58.

In FIG. 4, as well as in FIGS. 5-8, four pumps are illustrated, including three peristaltic pumps 61 and one nutating pump 64. The pumps 61 may be conventional peristaltic pumps which have been proven to be satisfactory for pumping sanitary liquids of limited viscosity such as milk, water and light syrups. For heavier or more viscous pumping, nutating-type piston pumps, such as the one shown generally at 64 in FIGS. 4, 5-8 and 17 are preferred, especially for chocolate syrup, which presents challenges in terms of pumping and accurate dispensing due to its high viscosity and slurry form.

Figure 5:
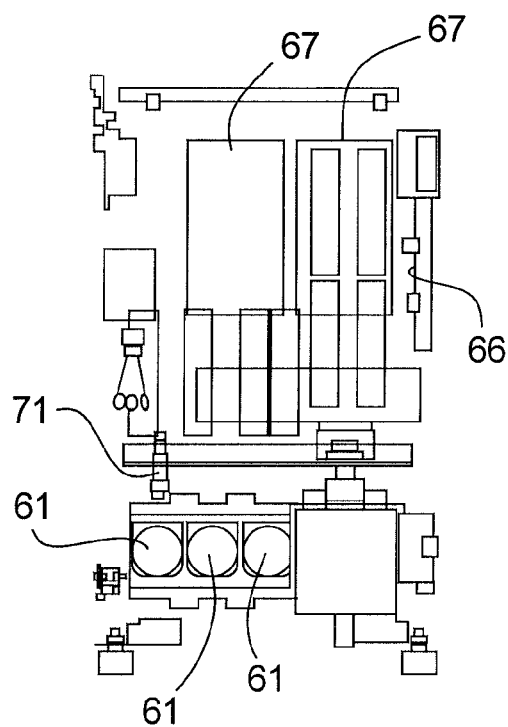
FIG. 5 is another front view of the modular flavor dispenser shown in FIGS. 2-4, with cabinetry and other supporting components removed.
Figure 6:
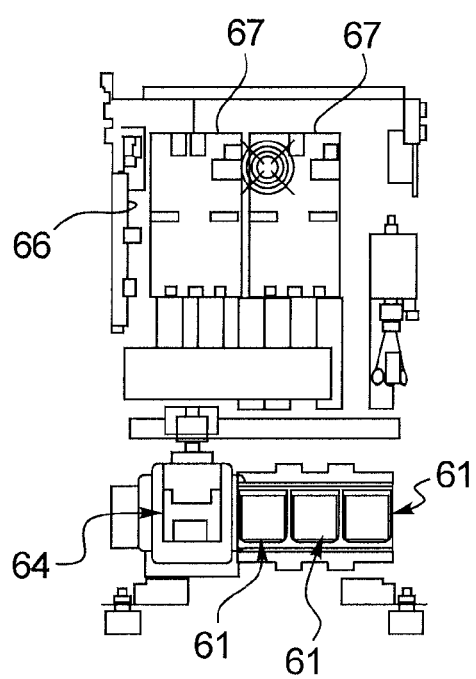
FIG. 6 is a rear view of the modular flavor dispenser shown in FIGS. 2-5, with cabinetry and other supporting components removed.
Figure 7:
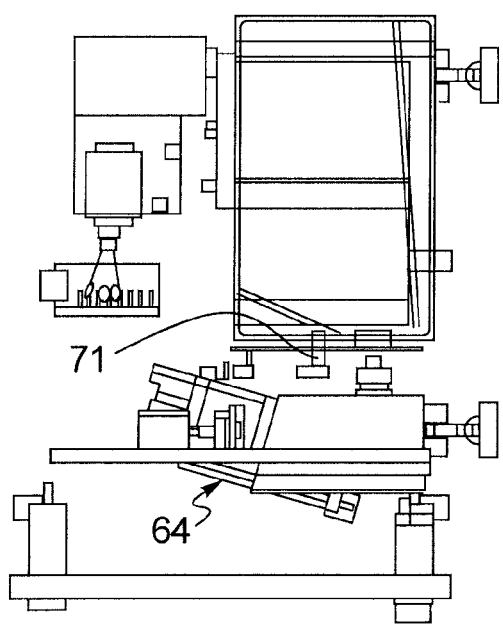
FIG. 7 is a right side view of the modular flavor dispenser shown in FIGS. 2-7, with cabinetry and other supporting components removed.
Figure 8:
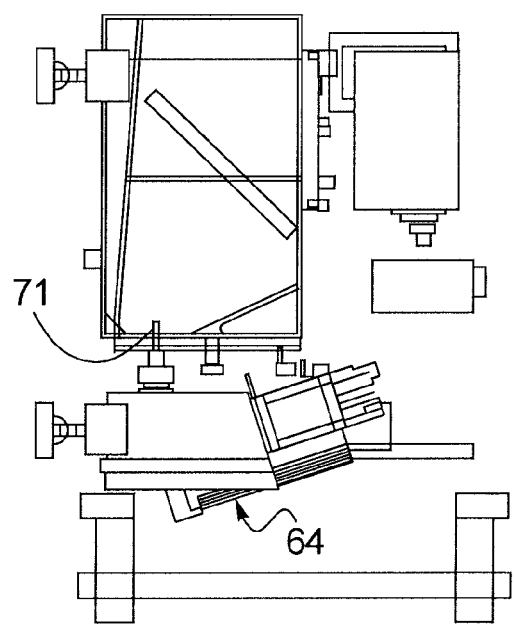
FIG. 8 is a left side view of the modular flavor dispenser shown in FIGS. 2-7, with cabinetry and other supporting components removed.
Figure 34:
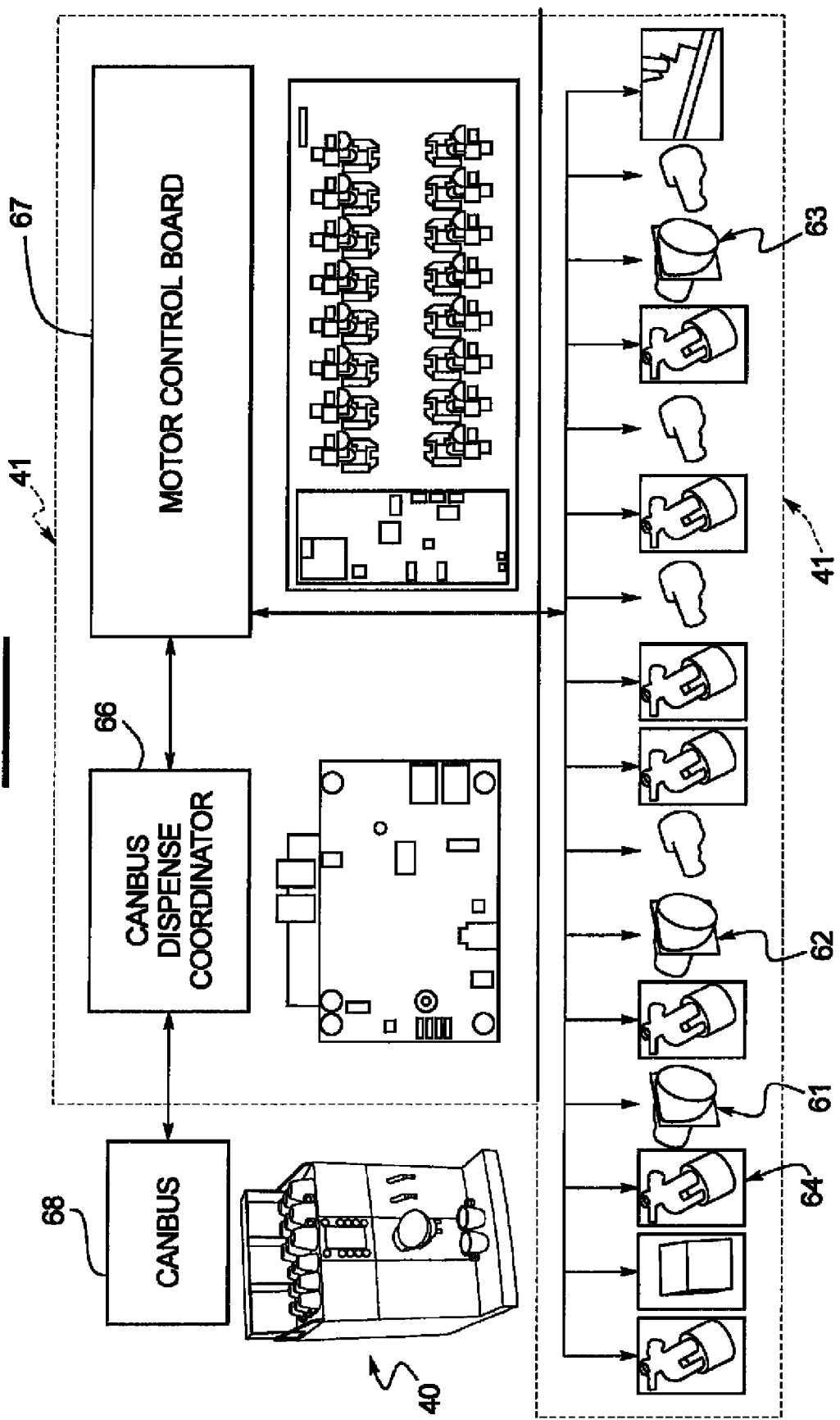
FIGS. 34-35 schematically illustrate a CAN Bus communication between the coffee machine, the modular flavor dispenser coordinator or interface and the control board for the flavor pumps and the motors for the flavor pumps.
Figure 35:
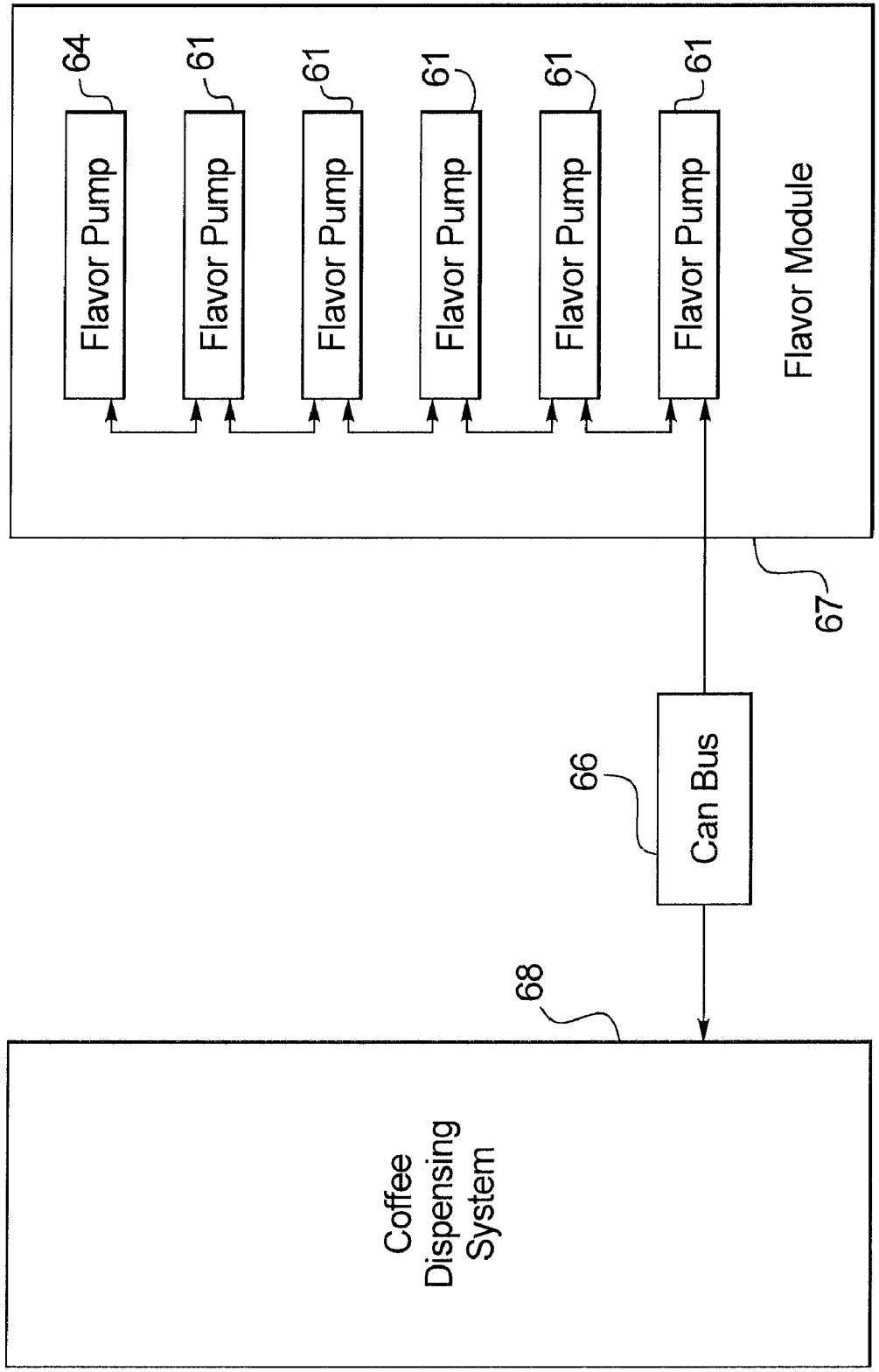

Three printed circuit boards (PCBs) are shown at 66-67 in FIGS. 4-6. These boards may include the dispenser coordinator board 66, which serves as an interface or dispense coordinator between the dispenser 41 and the controller of the coffee machine 40, and one or more motor control boards 67, which execute instructions from the dispenser coordinator board 66 and controls the motors of the pumps 61, 64. The controller 68 for the coffee machine 41 is shown in FIGS. 34-35 and schematically in FIG. 12. Each pump may include its own PCB 67 or pairs of pumps may share a PCB 67 as illustrated in FIGS. 5-6. Quick-connect connections for flexible flavor bags (IPN—Innovative Packaging Netherlands (http://www.ipnmanufacturing.com)) are shown generally at 71. Slots, brackets or shelves are shown at 72 for accommodating the flavor or packages. These packages may be flexible bags, bags contained in rigid cartons or box-type packages. The dispenser 41 may also be equipped with means for compressing or rolling the packages to increase the amount of flavor released from the packages. As the cost of chocolate and sugar rises, residual materials left in flavor packages can damage or limit profit margins. Therefore, a means for "squeezing" as much of the chocolate syrup out of a flexible bag as possible is desirable.

Figure 9:
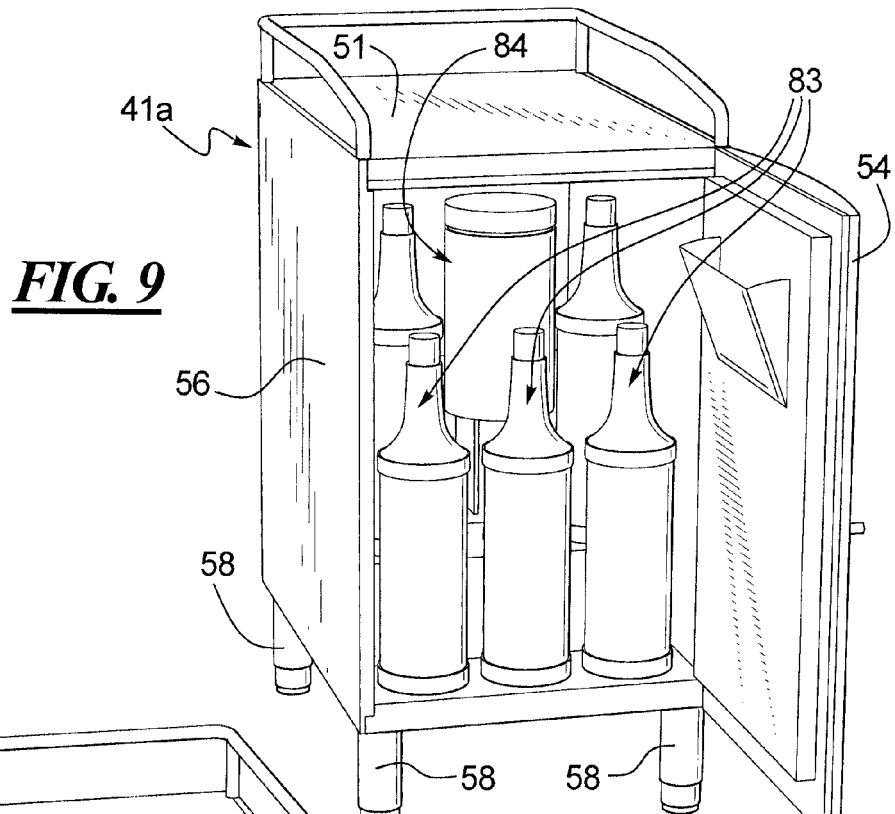
FIG. 9 is a perspective view of a disclosed modular flavor dispenser that dispenses five non-chocolate flavor syrups from upright bottles and a sixth chocolate syrup from an inverted bottle.
Figure 12:
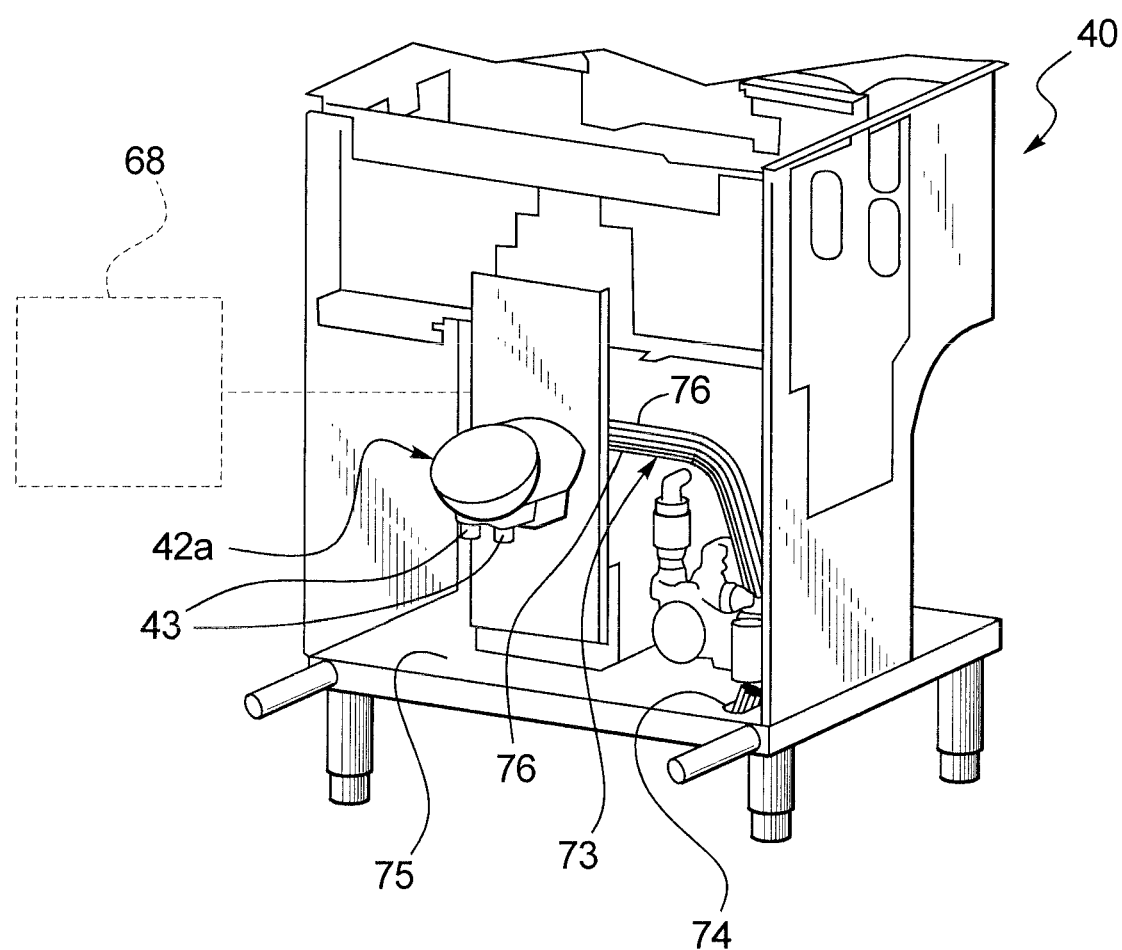
FIG. 12 is a partial perspective view of the coffee machine illustrated in FIGS. 1-2, particularly illustrating the routing of the flavor conduits to the manifold of the pre-existing coffee machine.
Figure 32:
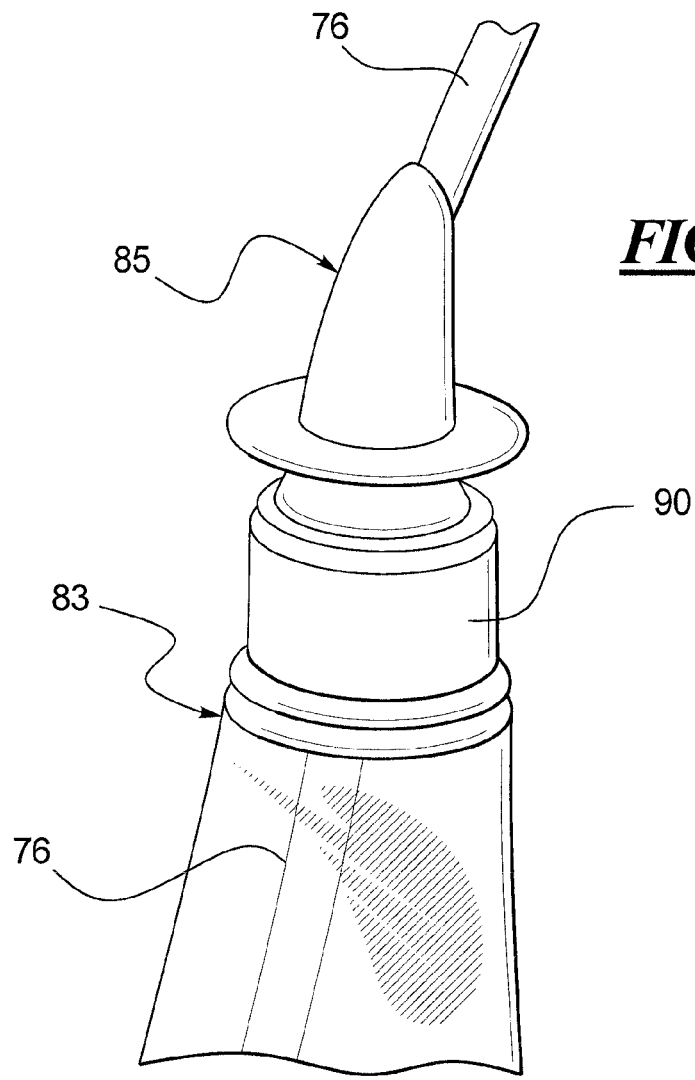
FIG. 32 illustrates a tube connection for a conventional flavor syrup bottle, wherein flavor is dispensed from a bottle with a bottle in an upright position.
Figure 33:
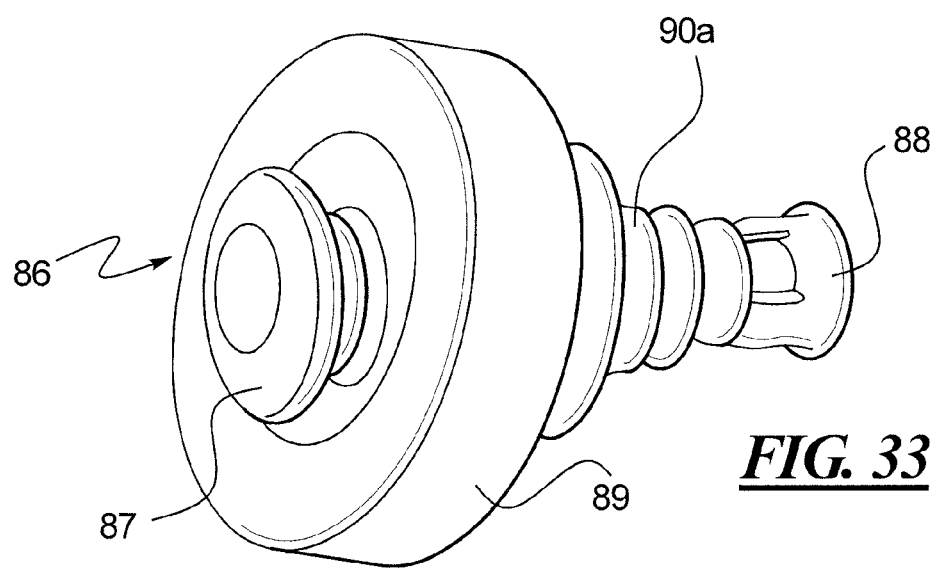
FIG. 33 is a perspective view of a fitting for a chocolate syrup bottle, wherein the chocolate syrup bottle is operated in an inverted position to minimize waste.

Another option is illustrated in FIG. 9 where the module 41a includes an inverted bottle 84 that is used to dispense chocolate syrup and conventional upright bottles 83 for dispensing non-chocolate wire-based syrups. The non-chocolate syrup bottles 83 are equipped with conventional female fittings 85 as shown in FIG. 32 that receive a flavor conduit 76 (see FIG. 12). In contrast, the chocolate syrup bottle 84 is equipped with the fitting 86 illustrated in FIG. 33. The fitting 86 includes an outlet 87 that is connected to a flavor conduit 76 (FIG. 12). The inlet 88 is disposed within the bottle. The outer cap 89 threadably connects to an open rim 90 of a chocolate syrup bottle (not shown in FIG. 33, see the bottle rim 90 illustrated in FIG. 32). Alternatively, a friction fit between the body 90a and the bottle rim 90 may also be employed.

Figure 9A:
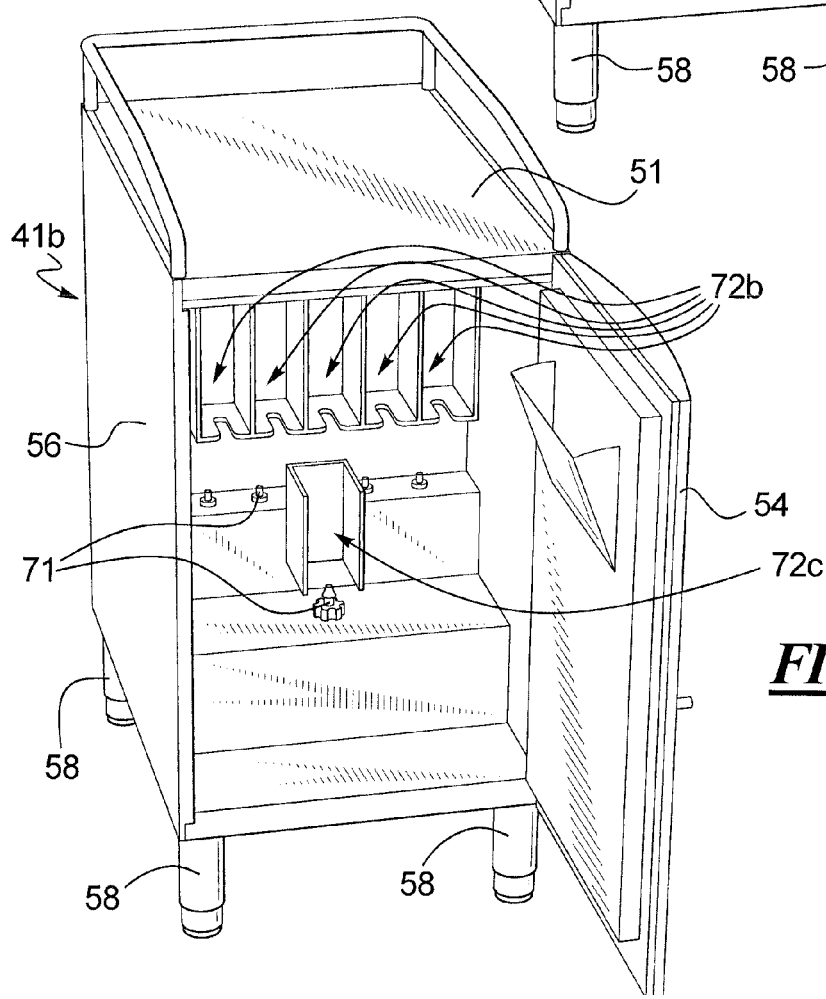
FIG. 9A is a perspective view of another disclosed modular flavor dispenser that dispenses five non-chocolate flavor syrups from inverted flexible bags and chocolate syrup from an inverted flexible bag, with the bags being removed for clarity.
Figure 10:
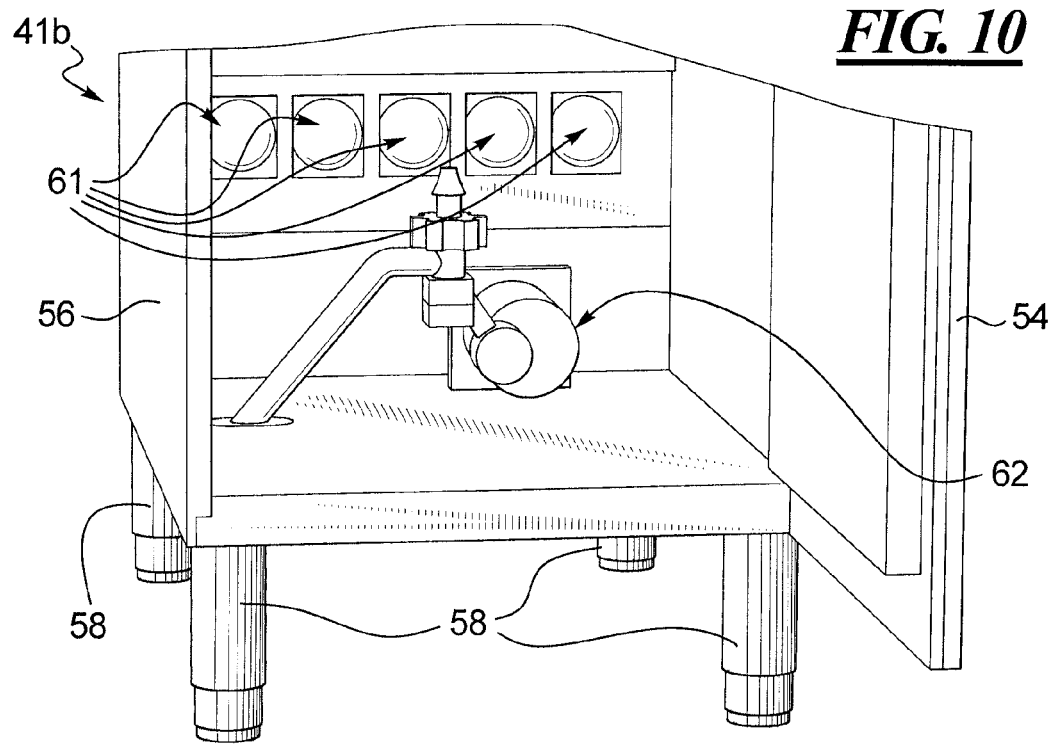
FIG. 10 is a partial front perspective view of the modular dispensers shown in FIGS. 9 and 9A, particularly illustrating the use of five peristaltic pumps for the non-chocolate flavor syrups and a nutating pump for the chocolate syrup.
Figure 11:
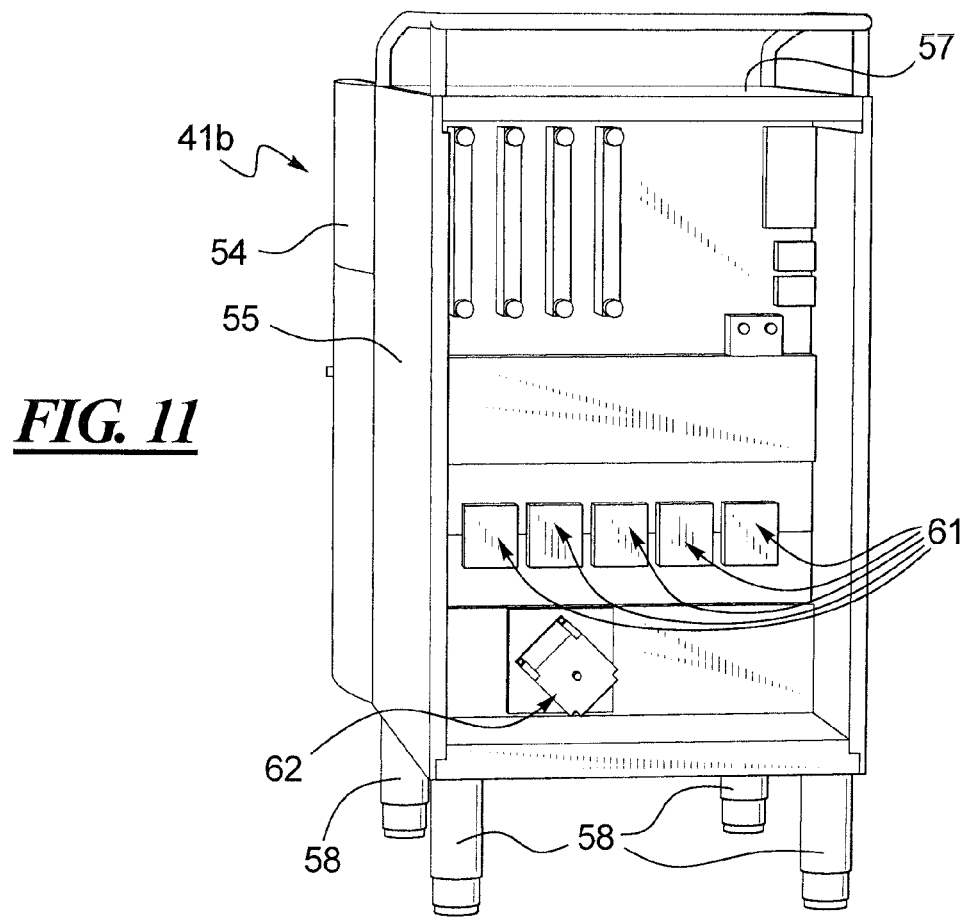
FIG. 11 is a rear perspective view of the modular flavor dispensers illustrated in FIGS. 9, 9A, and 10.

FIG. 9A illustrates another module 41b that includes five upper shelves 72b for accommodating five non-chocolate flavor bags (not shown) and a lower bracket 72c for accommodating a chocolate syrup bag (not shown). FIGS. 10-11 illustrate the location of the peristaltic pumps 61, which are preferably used for the non-chocolate syrups and the nutating pump 62, which is preferably used for the chocolate syrup.

FIG. 12 illustrates the ease in which the flavor dispenser 41 can be connected to a coffee machine 40. Specifically, a bundle 73 of conduits can enter the machine 40 through an opening 74 in the bottom panel 75. As discussed below in connection with FIGS. 18-29, the manifold 42a is modified to accommodate the individual flavor conduits 76.

Figure 13:
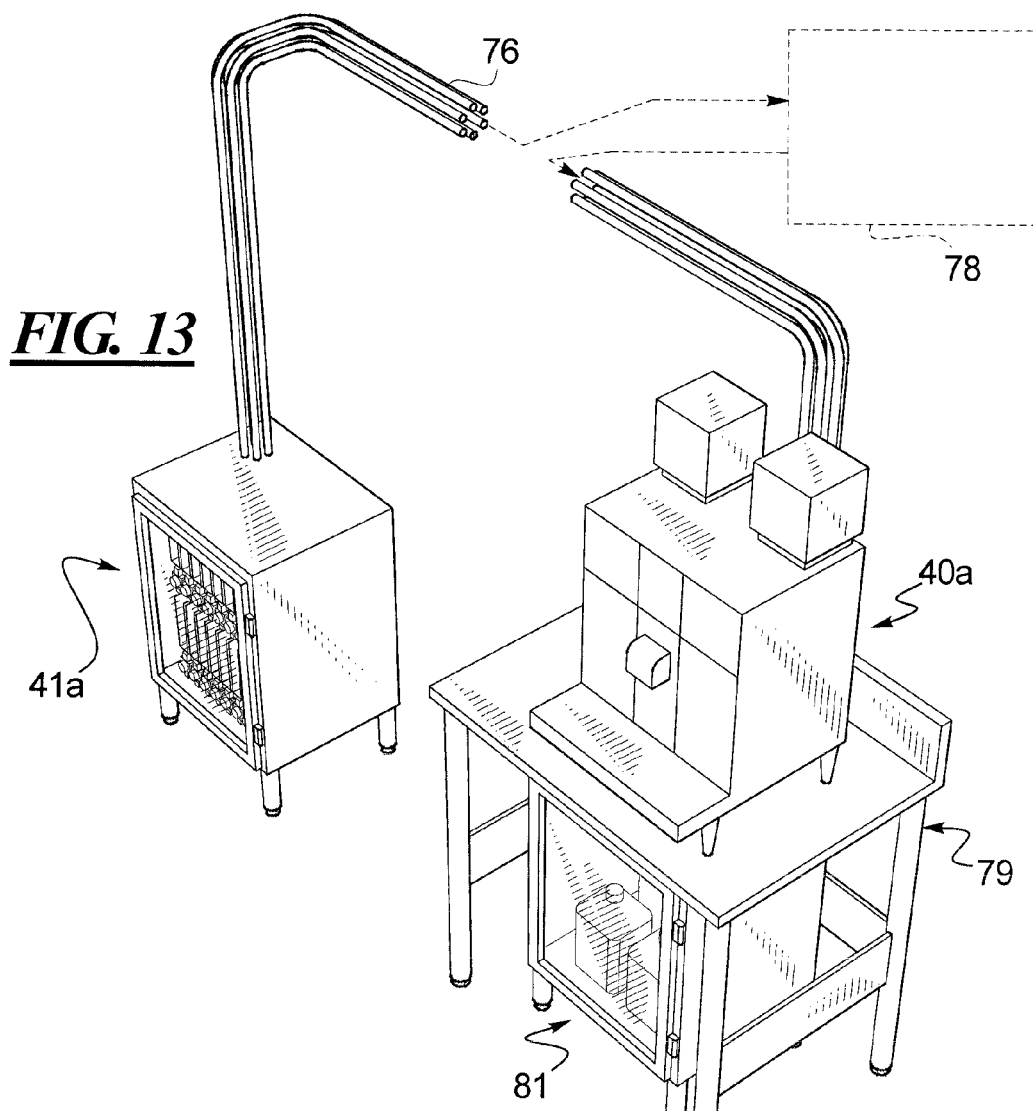
FIG. 13 is a perspective view illustrating a remote location of the disclosed modular flavor dispenser from a food or beverage machine with an intermediate pumping this station disposed therebetween.
Figure 14:
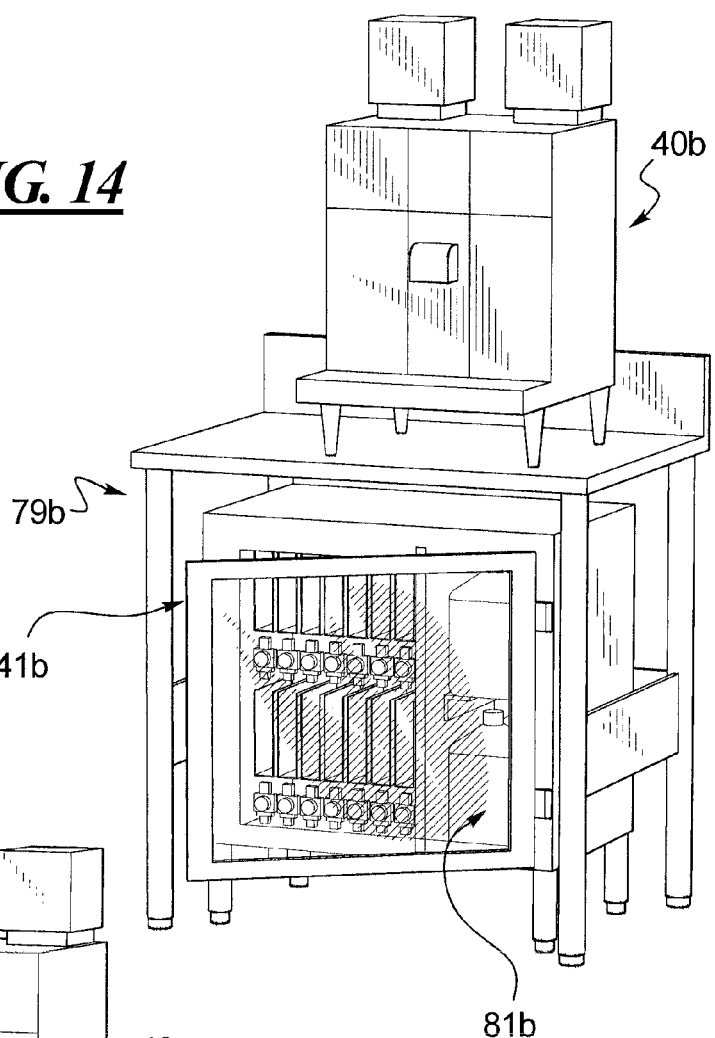
FIG. 14 illustrates an alternative configuration of a disclosed modular flavor dispenser disposed below the beverage dispenser, featuring a storage cabinet disposed next to the modular flavor dispenser.
Figure 15:
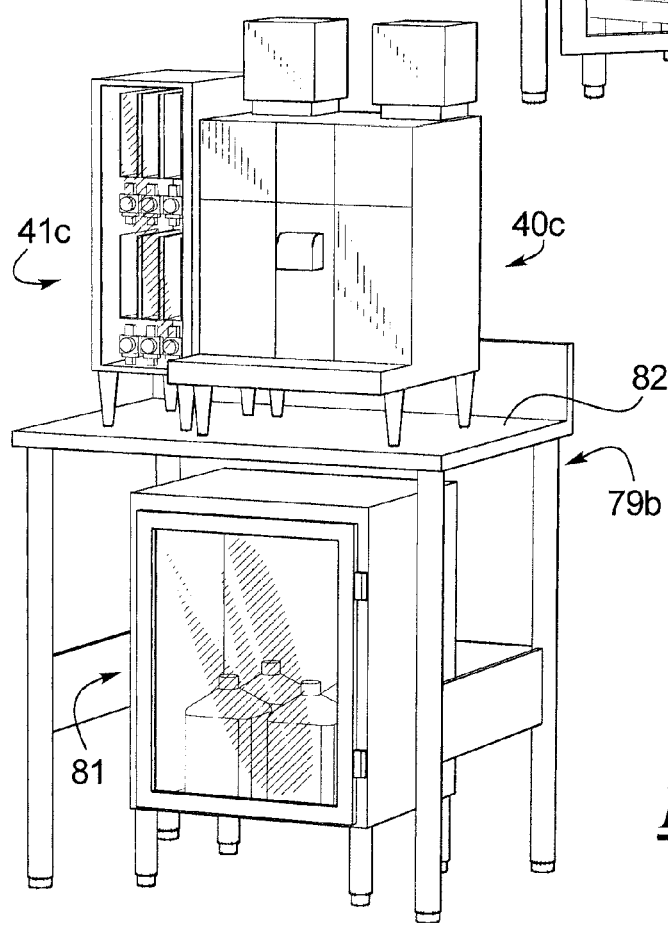
FIG. 15 illustrates yet another alternative configuration of a disclosed modular flavor dispenser disposed next to beverage dispenser, and featuring a lower storage cabinet.
Figure 16:
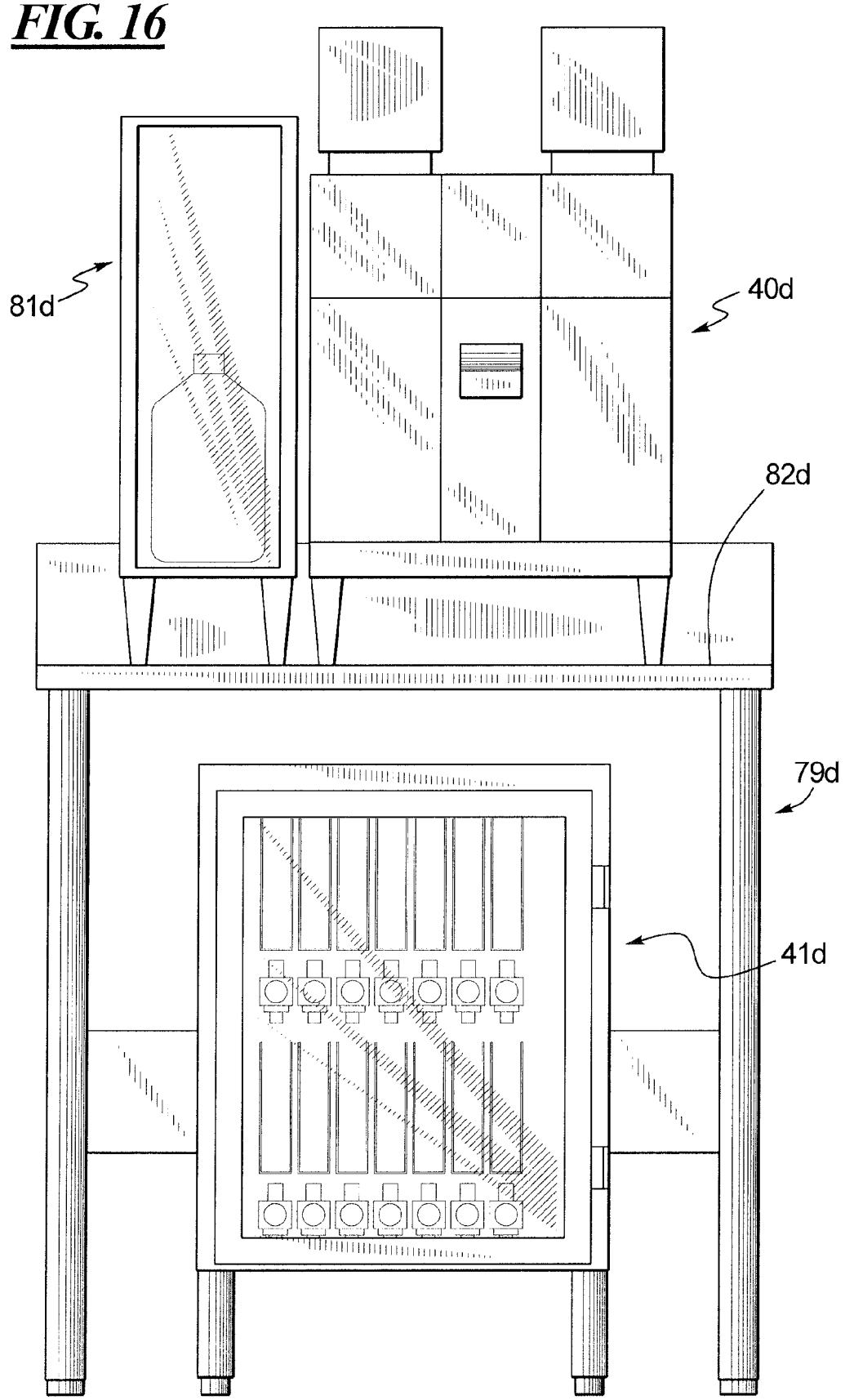
FIG. 16 illustrates an alternative configuration of a disclosed modular flavor dispenser disposed below the beverage dispenser, and featuring a storage cabinet next to the beverage dispenser.

FIGS. 13-16 illustrate various configurations for a food or beverage machine, such as a coffee maker 40a and a modular flavor dispenser 41a. Again, it will be noted that this disclosure is not limited to gourmet coffee making, but is applicable to adding flavors to other foods and beverages. In FIG. 13, the flavor module 41a is disposed remotely from the primary machine 40a. Accordingly, to deliver the flavors at the desired flow rate and pressure, an intermediate pump station, shown schematically at 78, may be required. The primary machine 40a may be disposed on a table 79 which can accommodate storage cabinet 81 as shown. In FIG. 14, the primary machine 40b is disposed on top of a table 79b which provides a storage space for the modular flavor dispenser 41b. An additional storage space is also shown to the right in 81b. In FIG. 15, the primary machine 40c is disposed on top of another table 79c with a smaller modules are flavor dispenser 42c also disposed in the upper surface 82 of the table 79c. A separate storage cabinet is shown at 81c below the table surface 82. Similarly, in FIG. 16, the primary machine 40d is disposed on the top 82d of the table 79 and the module or flavor dispenser 41d is disposed below the table surface 82d. Additional storage 81d is shown at the left of the primary machine 41d.

Figure 17:
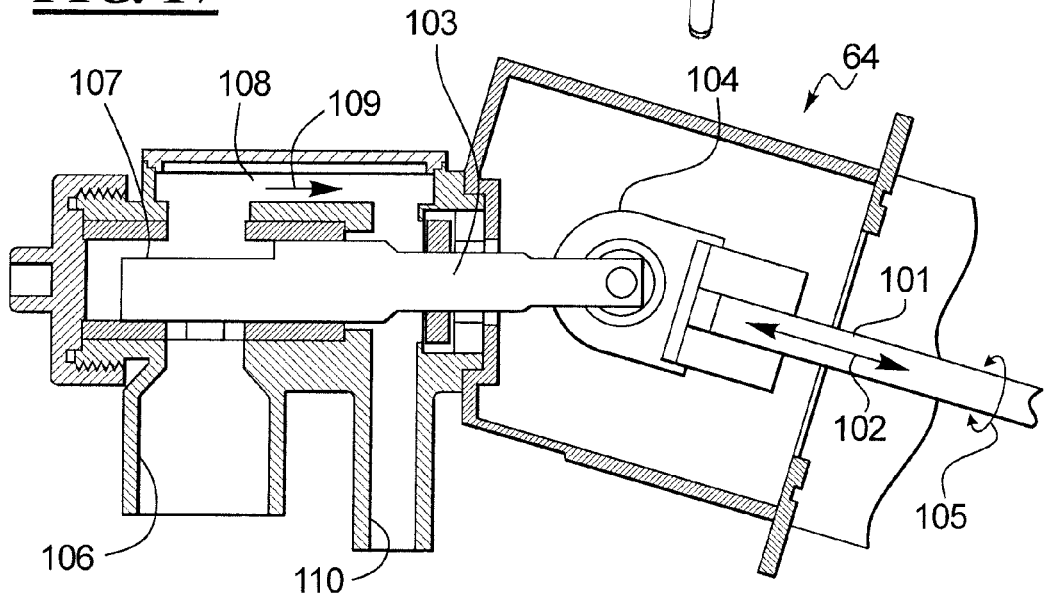
FIG. 17 is a sectional view of a nutating pump that may be used to pump the chocolate syrup as disclosed herein as well as in U.S. Pat. Nos. 6,749,402, 6,540,486 and 6,398,515, incorporated herein by reference.

FIG. 17 illustrates a nutating pump 64 which is also described in detail in U.S. Pat. Nos. 6,749,402, 6,540,486 and 6,398,515. The driveshaft 101 moves in both directions as indicated by the arrow 102 and rotates the piston 103 by way of the coupling connection 104 as indicated by the arrow 105. As a result, rotational movement of the piston 103 and its recess 107 to the right in FIG. 17 draws fluid through the inlet 106 and down the chamber 108 direction of the arrow 109 towards the outlet 110.

Figure 19:
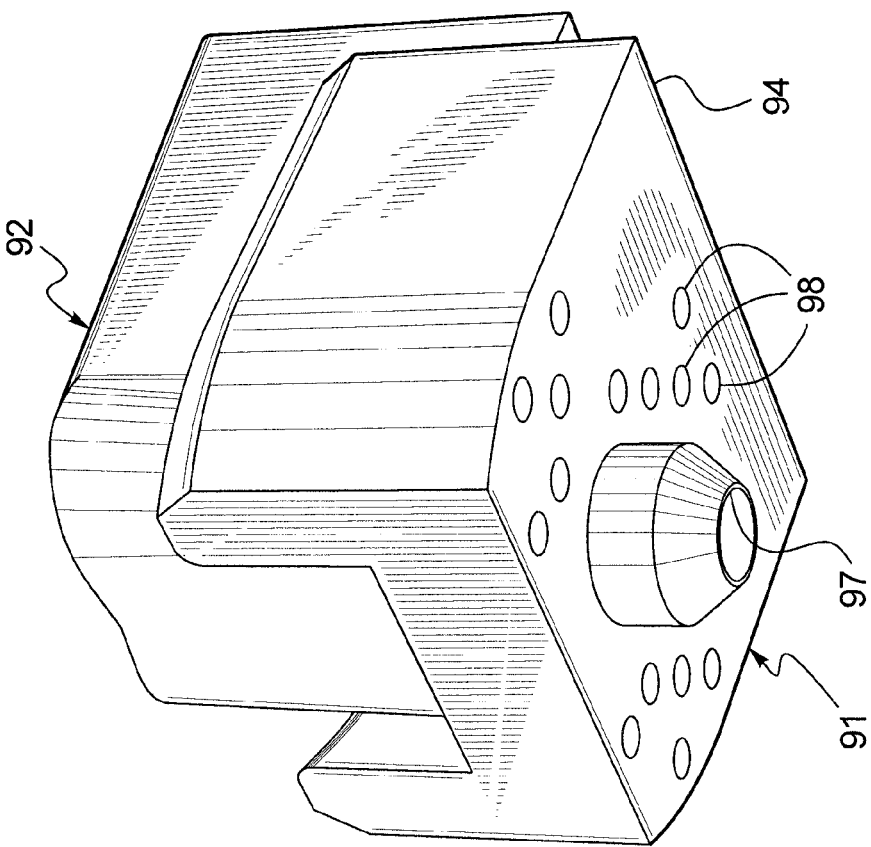
Figure 18:
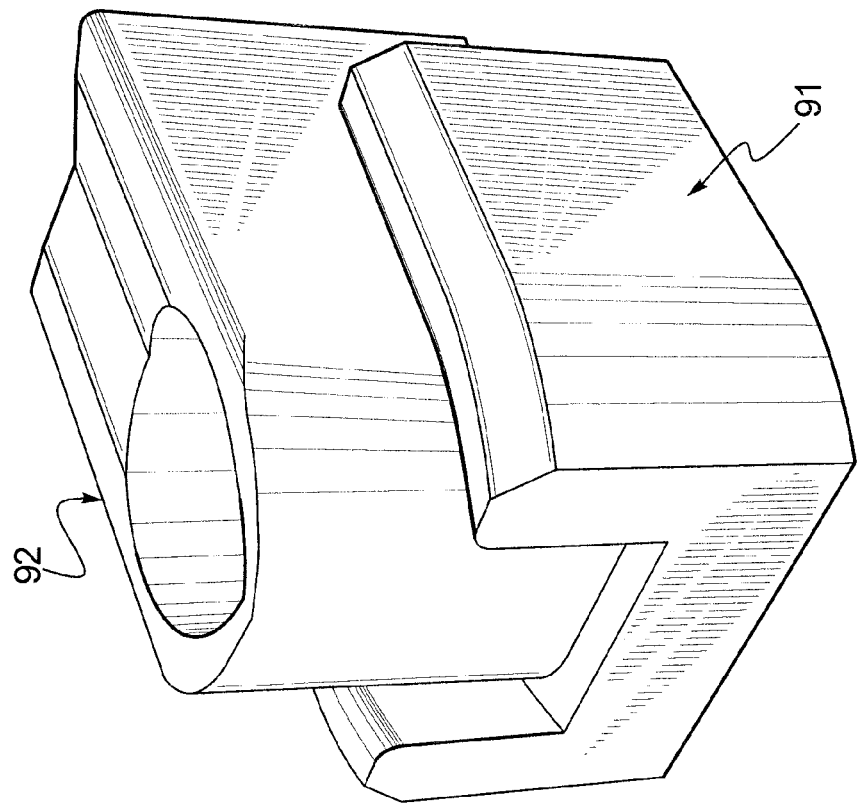
Figure 23:
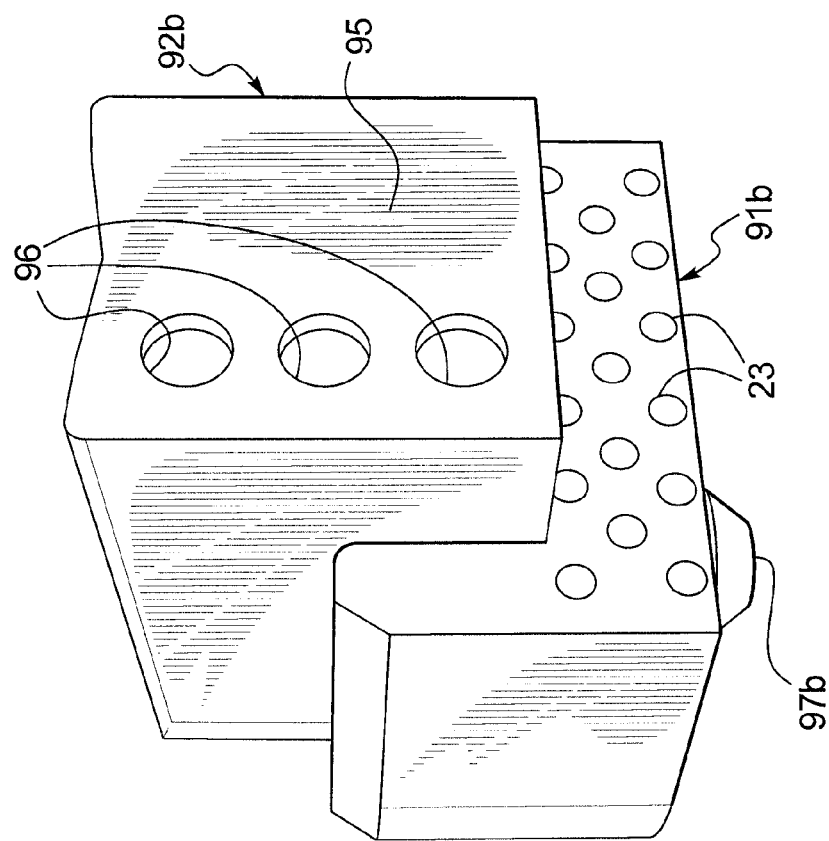
Figure 22:
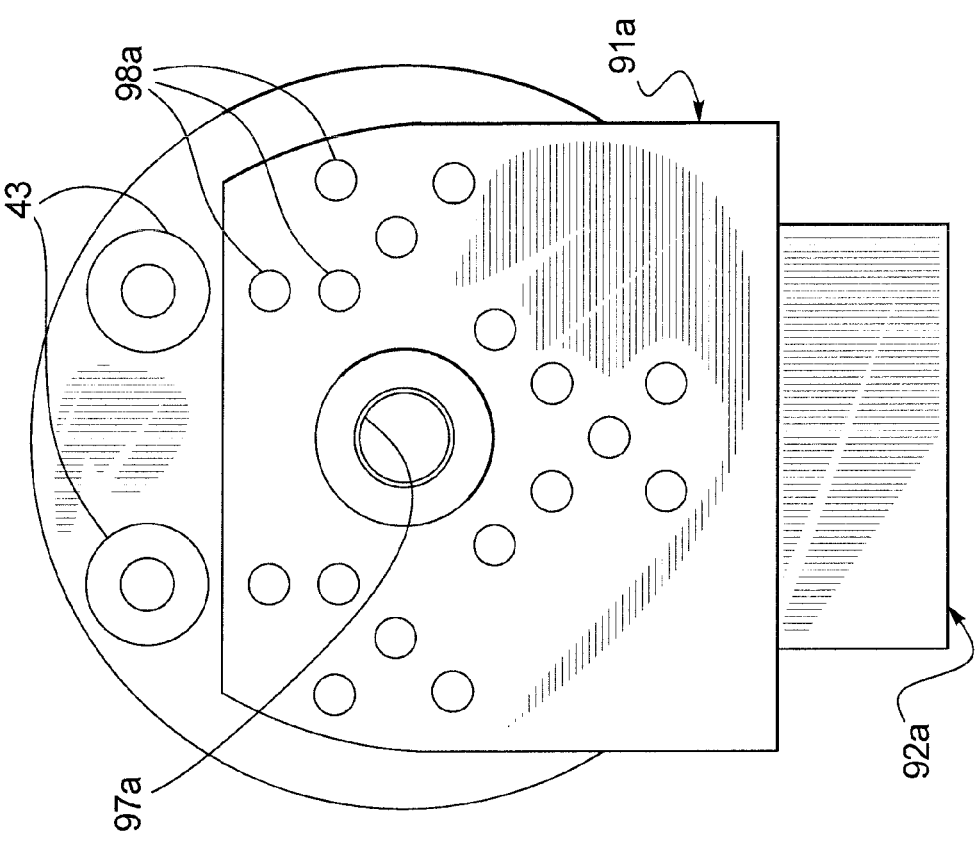

Various modifications to the manifold 42 are illustrated in FIGS. 18-29. In FIGS. 18-19, a flavoring block 91 accommodates a primary manifold block 92. The conduits 76 (FIG. 12) from the flavor dispenser 42 are received in the openings 93 spaced along the rear wall 94 of the flavor manifold block 91 (FIG. 21). Coffee dispense nozzles are shown at 43 in the embodiment of FIG. 22. In FIG. 23, milk and steam can be injected through the inlets 96 in the rear wall 95 of the primary block 92b and dispensed out through the common outlet 97b of the primary block 92b. As shown in FIGS. 19, 21 and 23, seventeen flavor inlets 93 and seventeen flavor outlets 98 are provided in contrast to the six inlets 93e and six outlets 98e of FIGS. 30-31.

Figure 29:
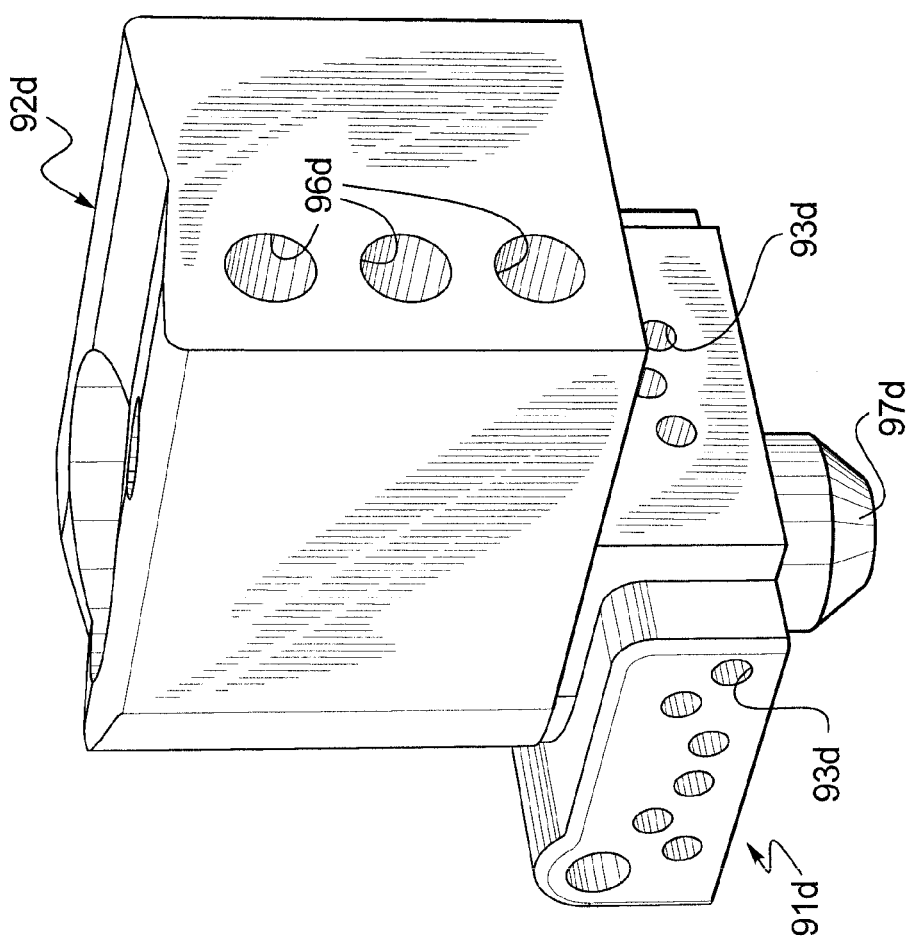
Figure 28:
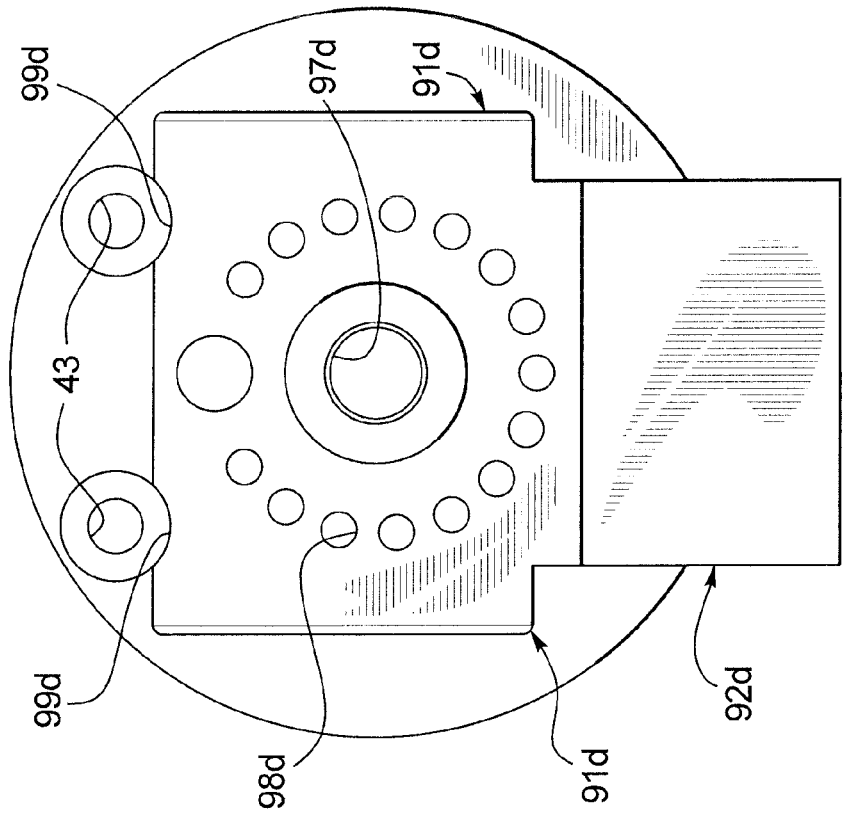
Figure 30:
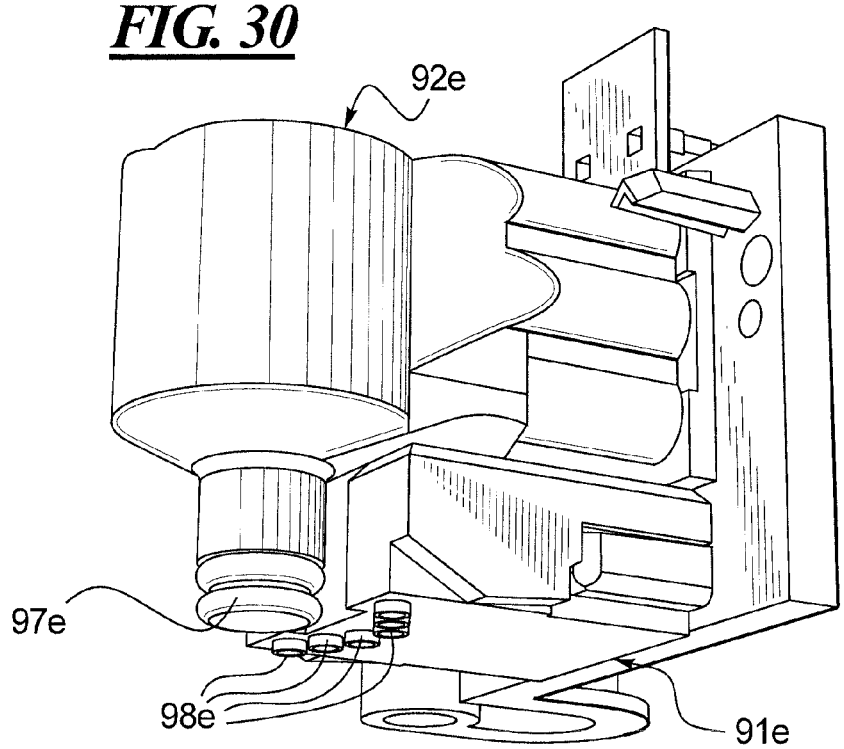
FIGS. 30-31 illustrate yet another flavor manifold that is compact and can be added to an existing milk steamer/foam manifold that features ports or nozzles for six (6) flavors.
Figure 31:
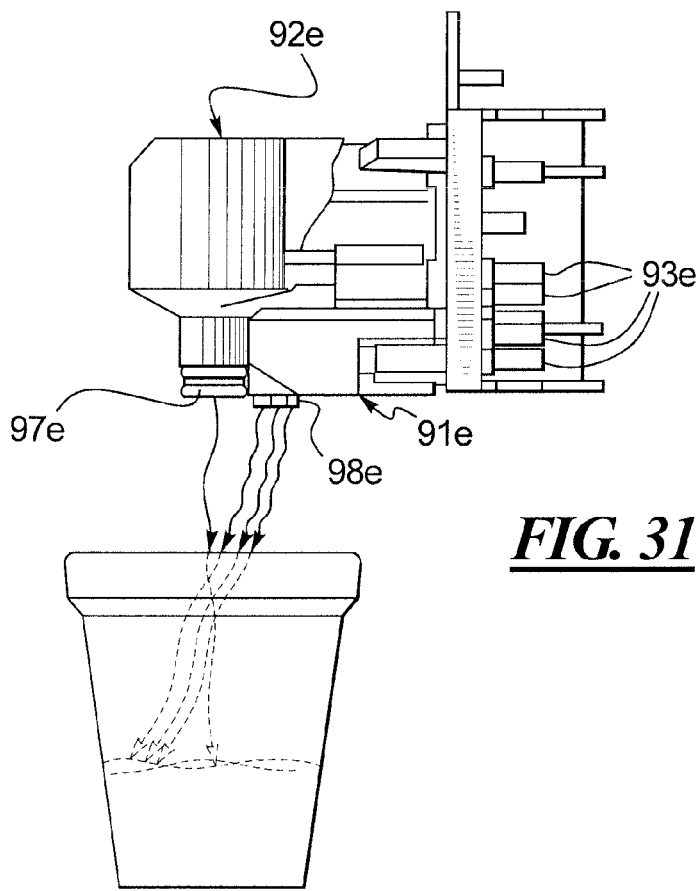

Another manifold design as illustrated in FIGS. 24-27 which is slightly more compact than in manifolds of FIGS. 18-23. The flavor inlets 93c are disposed along either sidewall 101, 102 and the rear wall 94c of the flavor manifold 91c and the flavor outlets 98c encircle the large milk/steam outlet 97c as seen in FIG. 25. A similar design is illustrated in FIGS. 28-29. The recesses shown at 99c and 99d in FIGS. 24-28 accommodate the coffee nozzles shown at 43 and FIGS. 1, 12 and 28. An advantage of the manifolds of FIGS. 18-29 is that they can be incorporated into an existing manifold 42 (FIG. 1) with relative ease.

Figure 36:
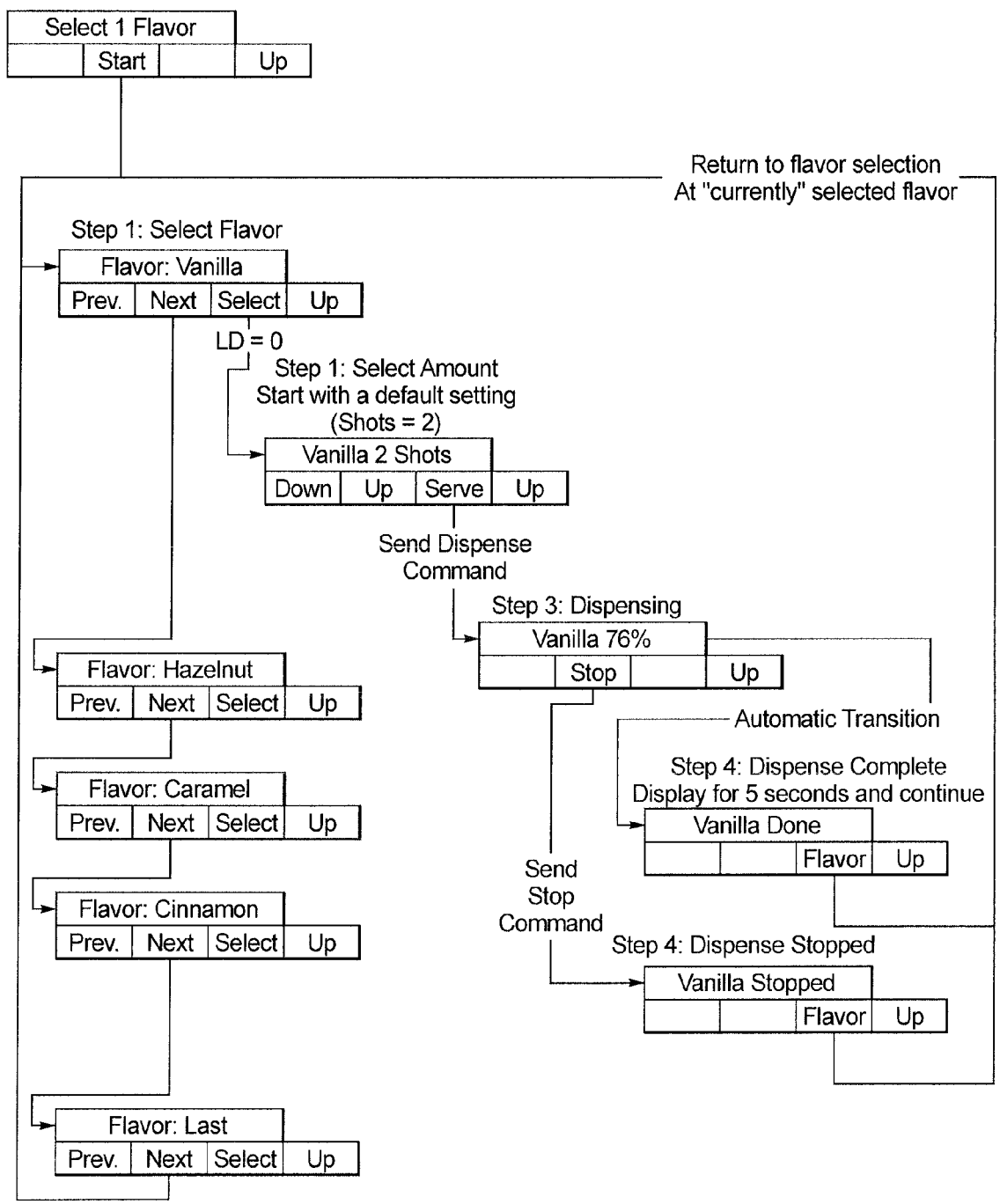
FIG. 36 illustrates, schematically, the selection of a single flavor, e.g. vanilla, for a coffee beverage.

The disclosed coffee machines 40 may communicate with the disclosed modular flavor dispensers using a CAN Bus system, as illustrated in FIGS. 34-35. Each modular flavor dispenser 41 includes a CAN Bus configured coordinator board 66 and, preferably, a motor control board 67, which controls the operation of the various motors used to dispense the flavors. As noted above, some or all of the motors may be stepper motors used to control the two preferred types of pumps—preferably peristaltic pumps 61 for non-chocolate water-based flavor syrups and nutating pumps 64 for chocolate syrup. The coordinator board 66 then communicates with the motor control board 67 of the modular flavor dispenser 41 which, in turn, may serially communicate with the various motors controlling the flavor pumps as illustrated in FIG. 35. A flow chart for a vanilla flavor dispense is illustrated in FIG. 36.

While only certain embodiments have been set forth, alternative embodiments and various modifications will be apparent from the above description to those skilled in the art. These and other alternatives are considered equivalents and within the spirit and scope of this disclosure.

What is claimed is:

1. A modular flavor dispenser for dispensing a plurality of flavors to a separate food or beverage machine wherein the plurality of flavors includes chocolate syrup and at least one non-chocolate syrup, the modular flavor dispenser comprising:

a dispense coordinator board linked to a motor control board, the dispense coordinator board executing a selected recipe by sending a series of signals to the motor control board, the motor board linked in series to a plurality of pump modules including at least one chocolate syrup pump module and at least one non-chocolate syrup pump module, each pump module comprising a pump module board, at least one pump and at least one flavor reservoir, each pump linked between its own flavor reservoir and its own outlet conduit, the chocolate syrup pump module including a nutating pump and the at least one non-chocolate syrup pump module including a peristaltic pump, the coordinator board, motor control board and pump module boards being programmed for the pumping of multiple flavors from the reservoirs to the separate machine in accordance with a selected recipe.

2. The modular flavor dispenser of claim 1 wherein the selected recipe is transmitted to the coordinator board by the separate food or beverage machine.

3. The modular flavor dispenser of claim 2 wherein communication between the separate food or beverage machine and the coordinator board is carried out over a controller area network (CAN).

4. The modular flavor dispenser of claim 2 wherein communication between the separate food or beverage machine and the coordinator board is carried out over a controller area network bus (CAN Bus).

5. The modular flavor dispenser of claim 1 wherein the motor control board controls operation of at least two different types of pumps including at least one peristaltic pump and at least one nutating pump.

6. The modular flavor dispenser of claim 1 further comprising an intermediate pumping station comprising a plurality of intermediate pumps with each intermediate pump associated with its own pump of one of the pump modules of the modular flavor dispenser, each intermediate pump being connected to its own secondary outlet conduit that is connected to a manifold of the separate food or beverage dispenser.

7. The modular flavor dispenser of claim 1 wherein each pump comprises a motor and the motor board causes each pump motor, at the end of a dispense, to execute a partial reverse rotation to draw flavor back towards its respective pump.

8. The modular flavor dispenser of claim 1 wherein each pump comprises a motor and each pump module board causes each motor, at the end of a dispense, to execute a partial reverse rotation to draw flavor back towards its respective pump.

9. The modular flavor dispenser of claim 1 wherein algorithms executed by the motor control board are dependent upon temperatures of the flavors being pumped.

10. The modular flavor dispenser of claim 1 wherein algorithms executed by the dispense coordinator board are dependent upon temperatures of the flavors being pumped.

11. The modular flavor dispenser of claim 1 wherein algorithms executed by the motor control board are dependent upon a temperature of at least one circuit disposed on the motor control board.

12. The modular flavor dispenser of claim 1 wherein algorithms executed by the dispense coordinator board are dependent upon a temperature of at least one circuit disposed on the motor control board.

* * * * *